(12) United States Patent
Cheng et al.

(10) Patent No.: US 8,774,117 B2
(45) Date of Patent: Jul. 8, 2014

(54) TERMINAL AND GRANT PROCESSING METHOD THEREOF

(75) Inventors: Xiang Cheng, Shenzhen (CN); Yazhu Ke, Shenzhen (CN); Lin Liu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/520,032

(22) PCT Filed: Jun. 13, 2011

(86) PCT No.: PCT/CN2011/075691
§ 371 (c)(1),
(2), (4) Date: Jun. 29, 2012

(87) PCT Pub. No.: WO2012/022191
PCT Pub. Date: Feb. 23, 2012

(65) Prior Publication Data
US 2013/0136070 A1 May 30, 2013

(30) Foreign Application Priority Data

Aug. 20, 2010 (CN) .......................... 2010 1 0265145

(51) Int. Cl.
| | |
|---|---|
| *H04W 4/00* | (2009.01) |
| *H04W 72/04* | (2009.01) |
| *H04W 72/14* | (2009.01) |
| *H04L 27/34* | (2006.01) |
| *H04W 72/12* | (2009.01) |
| *H04L 1/18* | (2006.01) |

(52) U.S. Cl.
CPC ...... *H04W 72/0413* (2013.01); *H04W 72/1289* (2013.01); *H04W 72/14* (2013.01); *H04L 1/1812* (2013.01); *H04L 27/34* (2013.01)
USPC ........................................................ 370/329

(58) Field of Classification Search
CPC .. H04L 27/34; H04W 72/0413; H04W 72/44; H04W 72/0466; H04W 72/0473; H04W 72/1278; H04W 72/14
USPC .................................................. 370/329–341
See application file for complete search history.

(56) References Cited

U.S. PATENT DOCUMENTS

| | | | |
|---|---|---|---|
| 2008/0225764 | A1* | 9/2008 | Tseng ............................ 370/310 |
| 2009/0059892 | A1* | 3/2009 | Marinier et al. .............. 370/349 |

FOREIGN PATENT DOCUMENTS

| | | |
|---|---|---|
| CN | 101436888 A | 5/2009 |
| CN | 101651897 A | 2/2010 |
| CN | 101796877 A | 8/2010 |
| KR | 20070055004 A | 5/2007 |

OTHER PUBLICATIONS

International Search Report for PCT/CN2011/075691 dated Aug. 19, 2011.

* cited by examiner

*Primary Examiner* — Kan Yuen
(74) *Attorney, Agent, or Firm* — Ling Wu; Stephen Yang; Ling and Yang Intellectual Property LLC

(57) ABSTRACT

Disclosed are a terminal and a grant processing method therefor. The method includes: when a terminal carries out the 16 quadrature amplitude modulation (16QAM) operation, if an absolute grant is mapped by using absolute grant value mapping relationship table 1, then scheduling grant table 1 will be utilized to update a serving grant; and if the absolute grant is mapped by using absolute grant value mapping relationship table 2, then scheduling grant table 2 will be utilized to update the serving grant. By way of the present invention, the boundaries of various tables match each other as far as possible, thereby the performance problem appearing during the engineering application can be solved, improving the performance of high speed uplink packet access (HSUPA) technology during engineering application.

10 Claims, 15 Drawing Sheets

TERMINAL AND GRANT PROCESSING METHOD THEREOF

TECHNICAL FIELD

The present invention relates to the resource scheduling technology in the high speed uplink packet access (HSUPA) system, and particularly, to a terminal and a grant processing method thereof.

BACKGROUND OF THE RELATED ART

HSUPA is a technology regarding uplink performance enhancement. HSUPA improves the data transmission rate of the terminal in the uplink direction of the access network by way of efficiently employing the power when the channel condition is good. HSUPA technology follows most characteristics of the conventional wireless communication technology, such as cell selection, synchronization, random access, basic mobility management, etc. The key technique of HSUPA lies in: Hybrid Automatic Repeat Request (HARQ), rapid scheduling of node B, 2 ms short transmission time interval (TTI).

The HSUPA scheduling algorithm decides the uplink data transmission rate of terminal by taking the following information into account: Received Total Wide band Power (RTWP), terminal transmission power, terminal power remaining, terminal cache capacity, traffic and priority and so on, and notifies the terminal of the maximum available uplink power resource by way of the downlink scheduling control signaling of "absolute grant" or "relative grant", and the power resource limits the maximum uplink data transmission rate of the terminal. In this case, the "absolute grant" provides the maximum uplink power resource available for the terminal and is the enhanced dedicated channel dedicated physical data channel (E-DPDCH)/dedicated physical control channel (DPCCH) power ratio allowed by each HARQ process at the utmost; the "relative grant" represents that the terminal is up-regulated or reduced by one relative value on the basis of the power resource used by the previous one scheduling, and the serving "relative grant" in particular includes three values of: UP, HOLD, and DOWN, and the non-serving "relative grant" in particular includes two values of: HOLD and DOWN. After having received the scheduling, the terminal will calculate one "serving grant". The "serving grant" is used for representing the maximum E-DPDCH/DPCCH power ratio for data transmission in the activated HARQ process when the Enhanced Dedicated Channel Transport Format Combination (E-TFC) selects an algorithm.

If the terminal receives the "absolute grant", then the terminal refers to the absolute grant value mapping relationship table 1 shown in Table 1 or refers to the absolute grant value mapping relationship table 2 shown in Table 2 to update the "serving grant".

TABLE 1

| Absolute grant value | Index number |
|---|---|
| $(168/15)^2 \times 6$ | 31 |
| $(150/15)^2 \times 6$ | 30 |
| $(168/15)^2 \times 4$ | 29 |
| $(150/15)^2 \times 4$ | 28 |
| $(134/15)^2 \times 4$ | 27 |
| $(119/15)^2 \times 4$ | 26 |
| $(150/15)^2 \times 2$ | 25 |
| $(95/15)^2 \times 4$ | 24 |

TABLE 1-continued

| Absolute grant value | Index number |
|---|---|
| $(168/15)^2$ | 23 |
| $(150/15)^2$ | 22 |
| $(134/15)^2$ | 21 |
| $(119/15)^2$ | 20 |
| $(106/15)^2$ | 19 |
| $(95/15)^2$ | 18 |
| $(84/15)^2$ | 17 |
| $(75/15)^2$ | 16 |
| $(67/15)^2$ | 15 |
| $(60/15)^2$ | 14 |
| $(53/15)^2$ | 13 |
| $(47/15)^2$ | 12 |
| $(42/15)^2$ | 11 |
| $(38/15)^2$ | 10 |
| $(34/15)^2$ | 9 |
| $(30/15)^2$ | 8 |
| $(27/15)^2$ | 7 |
| $(24/15)^2$ | 6 |
| $(19/15)^2$ | 5 |
| $(15/15)^2$ | 4 |
| $(11/15)^2$ | 3 |
| $(7/15)^2$ | 2 |
| Zero grant | 1 |
| Deactivated | 0 |

TABLE 2

| Absolute grant value | Index number |
|---|---|
| $(377/15)^2 \times 4$ | 31 |
| $(237/15)^2 \times 6$ | 30 |
| $(168/15)^2 \times 6$ | 29 |
| $(150/15)^2 \times 6$ | 28 |
| $(168/15)^2 \times 4$ | 27 |
| $(150/15)^2 \times 4$ | 26 |
| $(134/15)^2 \times 4$ | 25 |
| $(119/15)^2 \times 4$ | 24 |
| $(150/15)^2 \times 2$ | 23 |
| $(95/15)^2 \times 4$ | 22 |
| $(168/15)^2$ | 21 |
| $(150/15)^2$ | 20 |
| $(134/15)^2$ | 19 |
| $(119/15)^2$ | 18 |
| $(106/15)^2$ | 17 |
| $(95/15)^2$ | 16 |
| $(84/15)^2$ | 15 |
| $(75/15)^2$ | 14 |
| $(67/15)^2$ | 13 |
| $(60/15)^2$ | 12 |
| $(53/15)^2$ | 11 |
| $(47/15)^2$ | 10 |
| $(42/15)^2$ | 9 |
| $(38/15)^2$ | 8 |
| $(34/15)^2$ | 7 |
| $(30/15)^2$ | 6 |
| $(27/15)^2$ | 5 |
| $(24/15)^2$ | 4 |
| $(19/15)^2$ | 3 |
| $(15/15)^2$ | 2 |
| Zero grant | 1 |
| Deactivated | 0 |

For example, the index number of the "absolute grant" received by the terminal is 31, and the absolute grant value mapping relationship table 1 is used, then terminal refers to Table 1 to update the "serving grant", and the absolute grant value corresponding to the index number 31 in Table 1 is $(168/15)^2 \times 6$, thus the terminal updates the "serving grant" as $(168/15)^2 \times 6$, i.e. the maximum E-DPDCH/DPCCH power ratio for data transmission during the activated HARQ process is $(168/15)^2 \times 6$.

For another example, the index number of the "absolute grant" received by the terminal is 31, and the absolute grant value mapping relationship table 2 is used, then terminal refers to Table 2 to update the "serving grant", and the absolute grant value corresponding to the index number 31 in Table 2 is $(377/15)^2 \times 4$, thus the terminal updates the "serving grant" as $(377/15)^2 \times 4$, i.e. the maximum E-DPDCH/DPCCH power ratio for data transmission during the activated HARQ process is $(377/15)^2 \times 4$.

If the terminal receives the "relative grant", then the terminal will update the "serving grant" according to an algorithm of converting relative grant to serving grant. The algorithm of converting relative grant to serving grant in particular is:

a. The terminal refers to Table 3 (scheduling grant table 1) or refers to Table 4 (scheduling grant table 2);

TABLE 3

| Index number | Scheduling grant |
| --- | --- |
| 37 | $(168/15)^2 \times 6$ |
| 36 | $(150/15)^2 \times 6$ |
| 35 | $(168/15)^2 \times 4$ |
| 34 | $(150/15)^2 \times 4$ |
| 33 | $(134/15)^2 \times 4$ |
| 32 | $(119/15)^2 \times 4$ |
| 31 | $(150/15)^2 \times 2$ |
| 30 | $(95/15)^2 \times 4$ |
| 29 | $(168/15)^2$ |
| 28 | $(150/15)^2$ |
| 27 | $(134/15)^2$ |
| 26 | $(119/15)^2$ |
| 25 | $(106/15)^2$ |
| 24 | $(95/15)^2$ |
| 23 | $(84/15)^2$ |
| 22 | $(75/15)^2$ |
| 21 | $(67/15)^2$ |
| 20 | $(60/15)^2$ |
| 19 | $(53/15)^2$ |
| 18 | $(47/15)^2$ |
| 17 | $(42/15)^2$ |
| 16 | $(38/15)^2$ |
| 15 | $(34/15)^2$ |
| 14 | $(30/15)^2$ |
| 13 | $(27/15)^2$ |
| 12 | $(24/15)^2$ |
| 11 | $(21/15)^2$ |
| 10 | $(19/15)^2$ |
| 9 | $(17/15)^2$ |
| 8 | $(15/15)^2$ |
| 7 | $(13/15)^2$ |
| 6 | $(12/15)^2$ |
| 5 | $(11/15)^2$ |
| 4 | $(9/15)^2$ |
| 3 | $(8/15)^2$ |
| 2 | $(7/15)^2$ |
| 1 | $(6/15)^2$ |
| 0 | $(5/15)^2$ |

TABLE 4

| Index number | Scheduling grant |
| --- | --- |
| 37 | $(377/15)^2 \times 4$ |
| 36 | $(336/15)^2 \times 4$ |
| 35 | $(237/15)^2 \times 6$ |
| 34 | $(212/15)^2 \times 6$ |
| 33 | $(237/15)^2 \times 4$ |
| 32 | $(168/15)^2 \times 6$ |
| 31 | $(150/15)^2 \times 6$ |
| 30 | $(168/15)^2 \times 4$ |
| 29 | $(150/15)^2 \times 4$ |
| 28 | $(134/15)^2 \times 4$ |
| 27 | $(119/15)^2 \times 4$ |
| 26 | $(150/15)^2 \times 2$ |
| 25 | $(95/15)^2 \times 4$ |
| 24 | $(168/15)^2$ |
| 23 | $(150/15)^2$ |
| 22 | $(134/15)^2$ |
| 21 | $(119/15)^2$ |
| 20 | $(106/15)^2$ |
| 19 | $(95/15)^2$ |
| 18 | $(84/15)^2$ |
| 17 | $(75/15)^2$ |
| 16 | $(67/15)^2$ |
| 15 | $(60/15)^2$ |
| 14 | $(53/15)^2$ |
| 13 | $(47/15)^2$ |
| 12 | $(42/15)^2$ |
| 11 | $(38/15)^2$ |
| 10 | $(34/15)^2$ |
| 9 | $(30/15)^2$ |
| 8 | $(27/15)^2$ |
| 7 | $(24/15)^2$ |
| 6 | $(21/15)^2$ |
| 5 | $(19/15)^2$ |
| 4 | $(17/15)^2$ |
| 3 | $(15/15)^2$ |
| 2 | $(13/15)^2$ |
| 1 | $(12/15)^2$ |
| 0 | $(11/15)^2$ | b. When the terminal receives "one serving relative grant" (cell dedicated channel state or cell forward access channel state after conflict resolution), the terminal determines the minimum power ratio greater than or equal to the "reference power ratio" in Table 3 (scheduling grant table 1) or Table 4 (scheduling grant table 2), determines the index number of the minimum power ratio in the table, and marks the index number as "scheduling grant (power ratio)".

In this case, the "reference power ratio" is the E-DPDCH/DPCCH power ratio selected by E-TFC for which previous one transmission time interval with the same HARQ process as that of this data transmission is used.

When this serving relative grant is "UP", if the "scheduling grant (power ratio)" is less than "3 step index threshold", then the terminal updates the "serving grant" as the scheduling grant in the table corresponding to MIN ("scheduling grant (power ratio)"+3, 37) index; and if the "scheduling grant (power ratio)" is less than "2 step index threshold" and greater than or equal to "3 step index threshold", then the terminal updates the "serving grant" as the scheduling grant in the table corresponding to MIN ("scheduling grant (power ratio)"+2, 37) index; if the "scheduling grant (power ratio)" is greater than or equal to "2 step index threshold", then the terminal updates the "serving grant" as the scheduling grant in the table corresponding to MIN ("scheduling grant (power ratio)"+1, 37) index.

When this serving relative grant is "DOWN", then the terminal updates the "serving grant" as the scheduling grant in the table corresponding to MAX ("scheduling grant (power ratio)"−1, 0) index.

c. When the terminal receives one non-serving relative grant, the terminal determines the minimum power ratio greater than or equal to the maximum "reference recorded and stored power ratio" in the Table 3 (scheduling grant table 1) or Table 4 (scheduling grant table 2), determines the index number of the minimum power ratio in the table, and marks the index number as "scheduling grant (recorded and stored power ratio)".

In this case, the "reference recorded and stored power ratio" is a recorded and stored new value when the E-DPDCH/DPCCH power ratio selected by the E-TFC, for which the previous one transmission time interval with the same HARQ process as that of this data transmission is used, is updated to the new value.

When this non-serving relative grant is "DOWN", then the terminal updates the "serving grant" as the scheduling grant in the table corresponding to MAX ("scheduling grant (recorded and stored power ratio)"−1, 0) index.

There are two modulation manners used by HSUPA: quadrature phase shift keying (QPSK) and 16 quadrature amplitude modulation (16QAM). In this case, QPSK is a digital modulation manner and are classified as absolute phase shift and relative phase shift, and 16QAM represents the amplitude and phase combination modulation of 16 sample points, and the information quantity of each symbol is 2 times as much as that of QPSK. 16QAM is a digital high order modulation manner, and as compared to the ordinary modulation manner of QPSK, 16QAM can utilize the channel bandwidth more effectively.

In the related art, when the terminal carries out the 16QAM operation, the "serving grant" has to be updated by reference to Table 4 (scheduling grant table 2) in the algorithm of converting relative grant to serving grant.

In the above related art, during engineering application, the following performance problems may appear:

performance problem 1: when the terminal carries out the 16QAM operation, the index number of the "absolute grant" received by the terminal by reference to Table 1 (absolute grant value mapping relationship table 1) is the index number 31, and the index number 31 in Table 1 (absolute grant value mapping relationship table 1) represents that the absolute grant value is $(168/15)^2 \times 6$, thus the terminal updates the "serving grant" as $(168/15)^2 \times 6$, i.e. the maximum E-DPDCH/DPCCH power ratio for data transmission during the activated HARQ process is $(168/15)^2 \times 6$. Subsequently, if the terminal expects to be able to obtain bigger E-DPDCH/DPCCH power ratio to carry out transmission in a higher uplink data transmission rate, (for example, at this moment, the power remaining of the terminal is relatively high, or the cache capacity of the terminal is relatively high), then it only can be done by way of the serving relative grant "UP", and by reference to Table 4 (scheduling grant table 2), the "serving grant" is updated according to the algorithm of converting relative grant to serving grant, so as to up-regulate the "serving grant" step by step. Every time when one step is regulated, the time length of at least one transmission time interval is required. If it is expected to regulate "serving grant" from $(168/15)^2 \times 6$ to $(377/15)^2 \times 4$, then at least two steps need to be regulated, and the time length of at least two transmission time intervals is required. The HSUPA scheduling is required to be done within the time length of one transmission time interval, and if the processing time length of two transmission time intervals are required, then the processing time delay is increased by one time, which significantly affects the performance, and the terminal cannot be ensured to be responded promptly by way of rapid scheduling.

performance problem 2: when the terminal carries out the 16QAM operation, the index number of the "absolute grant" received by the terminal by reference to Table 2 (absolute grant value mapping relationship table 2) is 2, and the index number 2 in Table 2 (absolute grant value mapping relationship table 2) represents that the absolute grant value is $(15/15)$, thus the terminal updates the "serving grant" as $(15/15)$, i.e. the maximum E-DPDCH/DPCCH power ratio for data transmission during the activated HARQ process is $(15/15)^2$. Subsequently, if the terminal expects to be able to obtain smaller E-DPDCH/DPCCH power ratio to reduce the uplink data transmission rate, (for example, at this moment, the power remaining of the terminal is insufficient, or the cache capacity of the terminal is almost cleared), then it only can be done by way of the relative grant "DOWN", and by reference to Table 4 (scheduling grant table 2), the "serving grant" is updated according to the algorithm of converting relative grant to serving grant, so as to down-regulate the "serving grant" step by step. Every time when one step is regulated, the time length of at least one transmission time interval is required. If it is expected to regulate "serving grant" from $(15/15)^2$ to $(7/15)^2$, then at least two steps need to be regulated, and the time length of at least two transmission time intervals is required. The HSUPA scheduling has to be done within the time length of one transmission time interval, and if the processing time length of two transmission time intervals is required, then the processing time delay is increased by one time, which significantly affects the performance, and the terminal cannot be ensured to be responded promptly by way of rapid scheduling.

performance problem 3: when the terminal carries out the 16QAM operation, the index number of the "absolute grant" received by the terminal by reference to Table 1 (absolute grant value mapping relationship table 1) is 3, and the index number 3 in Table 1 (absolute grant value mapping relationship table 1) represents that the absolute grant value is $(11/15)$, thus the terminal updates the "serving grant" as $(11/15)^2$, i.e. the maximum E-DPDCH/DPCCH power ration for data transmission during the activated HARQ process is $(11/15)^2$. Subsequently, the terminal expects to obtain smaller E-DPDCH/DPCCH power ratio such as $(7/15)^2$ to reduce the uplink data transmission rate, (for example, at this moment, the power remaining of the terminal is insufficient, or the cache capacity of the terminal is almost cleared). Since at this moment the "serving grant" is already $(11/15)^2$, which is the lowest limit in Table 4 (scheduling grant table 2), the relative grant "DOWN" can no longer be utilized to down-regulate the "serving grant" step by step. At this moment, the scheduling regulation manner of relative grant is invalid.

The essential reasons for the above performance problems are as follows: the boundaries of Tables 1, 2, 3 and 4 are not aligned, the upper limit and lower limit in various tables are different, and the above performance problems appear during the use of bigger value and smaller value.

SUMMARY OF THE INVENTION

In view of this, the main object of the present invention is to provide a terminal and a grant processing method thereof, so as to solve the above performance problems during engineering application.

In order to achieve the above object, the technical solution in the present invention is implemented as follows:

the present invention provides a grant processing method for a terminal, comprising:

when a terminal carries out 16 quadrature amplitude modulation (16QAM) operation, if an absolute grant is mapped by using absolute grant value mapping relationship table 1, then scheduling grant table 1 will be utilized to update a serving grant; and if the absolute grant is mapped by using absolute grant value mapping relationship table 2, then scheduling grant table 2 will be utilized to update the serving grant.

The method further comprises: when the terminal does not carry out the 16QAM operation, the absolute grant value mapping relationship table 1 is utilized to map the absolute grant and the terminal uses the scheduling grant table 1 to update the serving grant.

The method further comprises: whether the terminal carries out the 16QAM operation is indicated to the terminal by a radio network controller (RNC) via a radio resource control (RRC) layer signaling.

The method further comprises: the terminal using the absolute grant value mapping relationship table 1 to map the absolute grant or using the absolute grant value mapping relationship table 2 to map the absolute grant is indicated to the terminal by the RNC via the RRC layer signaling.

Using the scheduling grant table 1 to update the serving grant is that:

the terminal refers to the scheduling grant table 1 and the serving grant is updated according to an algorithm of converting relative grant to serving grant, wherein two parameters involved in the algorithm, 3 step index threshold and 2 step index threshold, are indicated to the terminal by the RNC via the RRC layer signaling and the 3 step index threshold and 2 step index threshold correspond to indexes in the scheduling grant table 1.

The algorithm comprises:

when the terminal receives one serving relative grant, the terminal determines a minimum power ratio greater than or equal to a reference power ratio in the scheduling grant table 1, and determines an index number of the minimum power ratio in the scheduling grant table 1 and marks the determined index number as scheduling grant, wherein the reference power ratio is: enhanced dedicated channel dedicated physical data channel (E-DPDCH)/dedicated physical control channel (DPCCH) power ratio selected by enhanced dedicated channel transport format combination (E-TFC) for which previous one transmission time interval with the same hybrid automatic repeat request (HARQ) process as that of current data transmission is used.

when a terminal receives one non-serving relative grant, the terminal determines the minimum power ratio greater than or equal to the maximum reference recorded and stored power ratio in the scheduling grant table 1, and determines the index number of the minimum power ratio in the scheduling grant table 1, and marks the determined index number as scheduling grant, wherein the reference recorded and stored power ratio is: a recorded and stored new value when the E-DPDCH/DPCCH power ratio selected by the E-TFC, for which the previous one transmission time interval with the same HARQ process as that of the current data transmission is used, is updated to the new value.

Using the scheduling grant table 2 to update the serving grant is that:

the terminal refers to the scheduling grant table 2 and the serving grant is updated according to an algorithm of converting relative grant to serving grant, wherein two parameters involved in the algorithm, 3 step index threshold and 2 step index threshold, are indicated to the terminal by the RNC via the RRC layer signaling and the 3 step index threshold and 2 step index threshold correspond to indexes in the scheduling grant table 2.

The algorithm comprises:

when the terminal receives one serving relative grant, the terminal determines a minimum power ratio greater than or equal to a reference power ratio in the scheduling grant table 2, and determines an index number of the minimum power ratio in the scheduling grant table 2, and marks the index number as scheduling grant, wherein the reference power ratio is: the E-DPDCH/DPCCH power ratio selected by the E-TFC for which previous one transmission time interval with the same HARQ process as that of the current data transmission is used; and when terminal receives a non-serving relative grant, the terminal determines a minimum power ratio greater than or equal to the maximum reference recorded and stored power ratio in the scheduling grant table 2, and determines an index number of the minimum power ratio in the scheduling grant table 2, and marks the index number as scheduling grant, wherein the reference recorded and stored power ratio is: a recorded and stored new value when the E-DPDCH/DPCCH power ratio selected by the E-TFC, for which the previous one transmission time interval with the same HARQ process as that of the current data transmission is used, is updated to the new value.

The present invention also provides a terminal, comprising a first processing module for, when the terminal carries out 16QAM operation, if an absolute grant is mapped by using absolute grant value mapping relationship table 1, then using scheduling grant table 1 to update a serving grant; and if the absolute grant is mapped by using absolute grant value mapping relationship table 2, then using scheduling grant table 2 to update the serving grant.

The terminal further comprises: a second processing module for, when the terminal does not carry out the 16QAM operation, using the absolute grant value mapping relationship table 1 to map the absolute grant and using the scheduling grant table 1 to update the serving grant.

Whether the terminal carries out the 16QAM operation is indicated to the terminal by a RNC via a RRC layer signaling.

Using the absolute grant value mapping relationship table 1 to map the absolute grant or using the absolute grant value mapping relationship table 2 to map the absolute grant is indicated to the terminal by the RNC via the RRC layer signaling.

The first processing module is further for referring to the scheduling grant table 1 and updating the serving grant according to an algorithm of converting relative grant to serving grant, wherein two parameters involved in the algorithm, 3 step index threshold and 2 step index threshold, are indicated to the terminal by the RNC via the RRC layer signaling and the 3 step index threshold and 2 step index threshold correspond to indexes in the scheduling grant table 1.

The algorithm comprises: when the terminal receives one serving relative grant, determining a minimum power ratio greater than or equal to a reference power ratio in the scheduling grant table 1, determining an index number of the minimum power ratio in the scheduling grant table 1, and marking the determined index number as scheduling grant, wherein the reference power ratio is: E-DPDCH/DPCCH power ratio selected by E-TFC for which previous one transmission time interval with the same HARQ process as that of current data transmission is used; and when terminal receives one non-serving relative grant, determining the minimum power ratio greater than or equal to a maximum reference recorded and stored power ratio in the scheduling grant table 1, determining an index number of the minimum power ratio in the scheduling grant table 1, and marking the index number as scheduling grant, wherein the reference recorded and stored power ratio is: a recorded and stored new value when the E-DPDCH/DPCCH power ratio selected by the E-TFC, for which the previous one transmission time interval with the same HARQ process as that of the current data transmission is used, is updated to the new value.

The first processing module is further for referring to the scheduling grant table 2 and updating the serving grant according to an algorithm of converting relative grant to serving grant, wherein two parameters involved in the algorithm, 3 step index threshold and 2 step index threshold, are indicated to the terminal by the RNC via the RRC layer signaling and the 3 step index threshold and 2 step index threshold correspond to indexes in the scheduling grant table 2.

The algorithm comprises: when the terminal receives one serving relative grant, determining a minimum power ratio greater than or equal to the reference power ratio in the scheduling grant table 2, determining an index number of the minimum power ratio in the scheduling grant table 2, and marking the index number as scheduling grant, wherein the reference power ratio is: E-DPDCH/DPCCH power ratio selected by E-TFC for which previous one transmission time interval with the same HARQ process as that of current data transmission is used; and when terminal receives one non-serving relative grant, the terminal determines a minimum power ratio greater than or equal to a maximum reference recorded and stored power ratio in the scheduling grant table 2, determining an index number of the minimum power ratio in the scheduling grant table 2, and marking the index number as scheduling grant, wherein the reference recorded and stored power ratio is: a recorded and stored new value when the E-DPDCH/DPCCH power ratio selected by the E-TFC, for which the previous one transmission time interval with the same HARQ process as that of the current data transmission is used, is updated to the new value.

A terminal and a grant processing method therefor provided by the present invention, when the terminal carries out the 16QAM operation and in the situation where the absolute grant is mapped by using the "absolute grant value mapping relationship table 1", the terminal updates the "serving grant" by using the "scheduling grant table 1"; and in the situation where the absolute grant is mapped by using the "absolute grant value mapping relationship table 2", then the terminal updates the "serving grant" by using "scheduling grant table 2". As such, the "absolute grant value mapping relationship table 1" reflecting the absolute grant matches the "scheduling grant table 1" reflecting the relative grant, and the "absolute grant value mapping relationship table 2" reflecting the absolute grant matches the "scheduling grant table 2" reflecting the relative grant. The upper limits in these two groups of matching tables are completely consistent, and complete coverage of absolute grant and relative grant can be achieved. The lower limits of these two groups of matching tables are spaced with 2 values, and after the absolute grant, finer regulation can be achieved by using a relative grant command once. By way of the present invention, the boundaries of various tables match each other as far as possible, thereby the performance problem appearing during the engineering application can be solved, improving the performance of HSUPA technology during engineering application.

PREFERRED EMBODIMENTS OF THE PRESENT INVENTION

Figure 1:
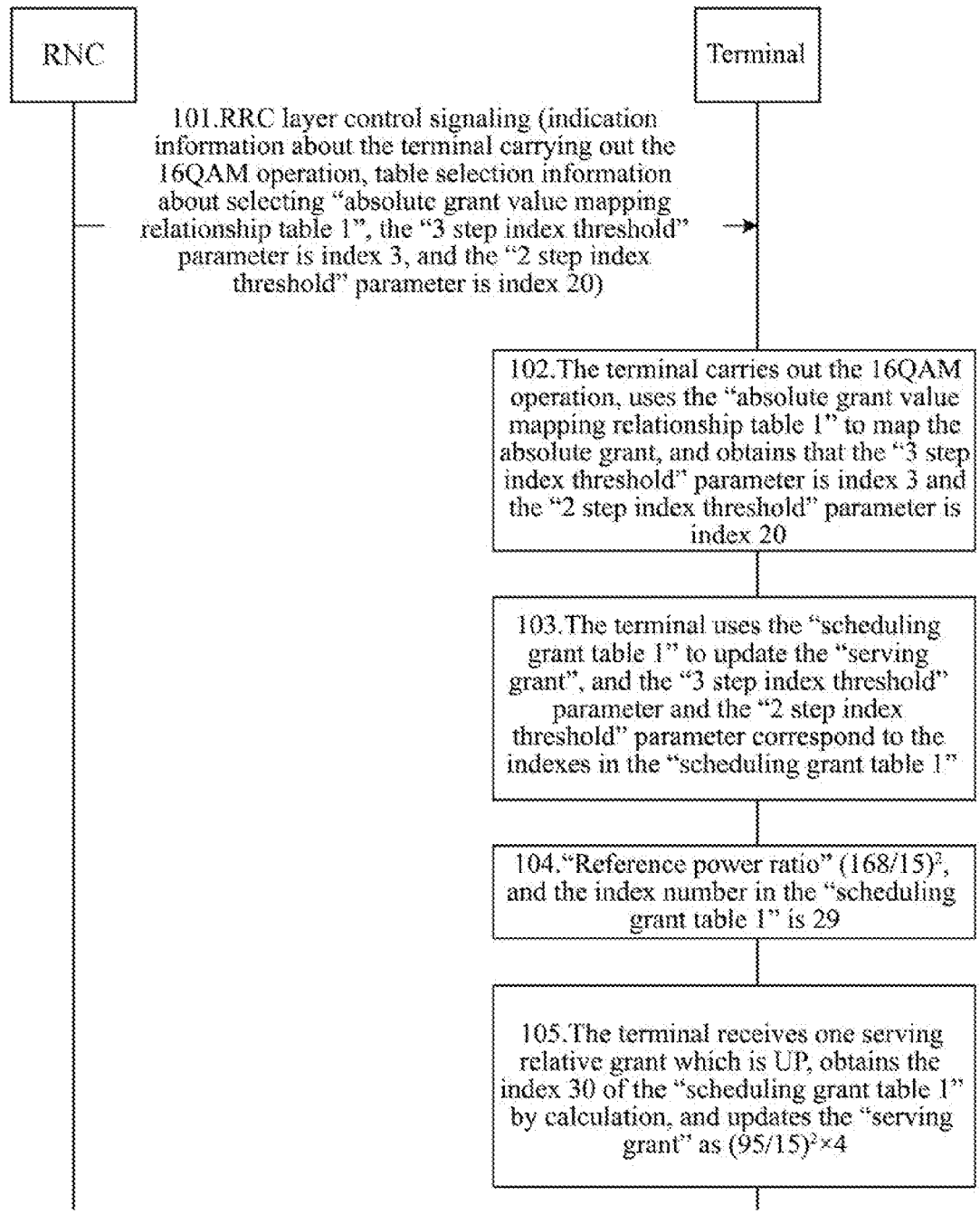
FIG. 1 is a flowchart of a grant processing method for a terminal in embodiment I of the present invention.

Hereinafter, the technical solution of the present invention will be described in detail in conjunction with the accompanying drawings and particular embodiments.

A grant processing method for terminal provided by the present invention includes: when a terminal carries out the 16QAM operation, if an absolute grant is mapped by using "absolute grant value mapping relationship table 1", then "scheduling grant table 1" will be utilized to update a serving grant; and if the absolute grant is mapped by using "absolute grant value mapping relationship table 2", then "scheduling grant table 2" will be utilized to update the serving grant.

In this case, when the terminal does not carry out the 16QAM operation, the "absolute grant value mapping relationship table 1" is utilized to map the absolute grant and the terminal uses the "scheduling grant table 1" to update the serving grant.

In this case, whether the terminal carries out the 16QAM operation is indicated to the terminal by a radio network controller (RNC) via a radio resource control (RRC) layer signaling. In particular, the RNC sends an RRC layer control signaling to the terminal, and the signaling carries indication information about whether the terminal carries out the 16QAM operation, if it is indication information about the terminal carrying out the 16QAM operation, the terminal carries out the 16QAM operation; and if it is indication information about the terminal not carrying out the 16QAM operation, the terminal does not carry out the 16QAM operation.

Furthermore, the terminal using the "absolute grant value mapping relationship table 1" to map the absolute grant or using the "grant value mapping relationship table 2" to map the absolute grant is indicated to the terminal by the RNC via the RRC layer signaling. In particular, the RNC sends an RRC layer control signaling to the terminal, and the signaling carries table selection information about selecting "absolute grant value mapping relationship table 1" or "absolute grant value mapping relationship table 2", when it is indicated to select the "absolute grant value mapping relationship table 1", then the terminal uses the "absolute grant value mapping relationship table 1" to map the absolute grant; and when it is indicated to select the "absolute grant value mapping relationship table 2", then the terminal uses the "absolute grant value mapping relationship table 2" to map the absolute grant.

Furthermore, the terminal refers to the "scheduling grant table 1" and update the serving grant according to an algorithm of converting relative grant to serving grant, wherein two parameters involved in the algorithm, "3 step index threshold" and "2 step index threshold", are indicated to the terminal by the RNC via the RRC layer signaling and the "3 step index threshold" and "2 step index threshold" correspond to the indexes in the "scheduling grant table 1". This algorithm particularly includes:

when the terminal receives one serving relative grant (cell dedicated channel state or cell forward access channel state after conflict resolution), the terminal determines the minimum power ratio greater than or equal to the "reference power ratio" in the "scheduling grant table 1", determines the index of the minimum power ratio in the "scheduling grant table 1", and marks the determined index number as "scheduling grant (power ratio)", wherein the "reference power ratio" is: E-DPDCH/DPCCH power ratio selected by E-TFC for which previous one transmission time interval with the same HARQ process as that of current data transmission is used; for example, when this serving relative grant is "UP", if the "scheduling grant (power ratio)" is less than "3 step index threshold", then the terminal updates the "serving grant" as the scheduling grant in the "scheduling grant table 1" corresponding to the MIN ("scheduling grant (power ratio)"+3, 37) index; if the "scheduling grant (power ratio)" is less than "2 step index threshold" and greater than or equal to "3 step index threshold", then the terminal updates the "serving grant" as the scheduling grant in the "scheduling grant table 1" corresponding to the MIN ("scheduling grant (power ratio)"+2, 37) index; if the "scheduling grant (power ratio)" is greater than or equal to "2 step index threshold", then the terminal updates the "serving grant" as the scheduling grant in the "scheduling grant table 1" corresponding to the MIN ("scheduling grant (power ratio)"+1, 37) index; and when this serving relative grant is "DOWN", the terminal updates the "serving grant" as the scheduling grant in the "scheduling grant table 1" corresponding to the MAX ("scheduling grant (power ratio)"−1, 0) index;

when terminal receives one non-serving relative grant, the terminal determines the minimum power ratio greater than or equal to the maximum "reference recorded and stored power ratio" in the "scheduling grant table 1", determines the index number of the minimum power ratio in the "scheduling grant table 1", and marks the determined index number as "scheduling grant (reference recorded and stored power ratio)", wherein the "reference recorded and stored power ratio" is: a recorded and stored new value when the E-DPDCH/DPCCH power ratio selected by the E-TFC, for which the previous one transmission time interval with the same HARQ process as that of the current data transmission is used, is updated to the new value. For example, when this non-serving relative grant is "DOWN", then the terminal updates the "serving grant" as the scheduling grant in the "scheduling grant table 1" corresponding to MAX ("scheduling grant (recorded and stored power ratio)"−1, 0) index.

Furthermore, the terminal refers to the "scheduling grant table 2" and updates the serving grant according to an algorithm of converting relative grant to serving grant, wherein two parameters involved in the algorithm, "3 step index threshold" and "2 step index threshold", are indicated to the terminal by the RNC via the RRC layer signaling and the "3 step index threshold" and "2 step index threshold" correspond to the indexes in the scheduling grant table 2. This algorithm particularly includes:

when the terminal receives one serving relative grant (cell dedicated channel state or cell forward access channel state after conflict resolution), the terminal determines the "minimum power ratio" greater than or equal to the "reference power ratio" in the "scheduling grant table 2", determines the index number of the minimum power ratio in the "scheduling grant table 2", and marks the determined index number as "scheduling grant (power ratio)", wherein the "reference power ratio" is: E-DPDCH/DPCCH power ratio selected by E-TFC for which previous one transmission time interval with the same HARQ process as that of current data transmission is used; for example, when this serving relative grant is "UP", if the "scheduling grant (power ratio)" is less than "3 step index threshold", then the terminal updates the "serving grant" as the scheduling grant in the "scheduling grant table 2" corresponding to the MIN ("scheduling grant (power ratio)"+3, 37) index; if the "scheduling grant (power ratio)" is less than "2 step index threshold" and greater than or equal to "3 step index threshold", then the terminal updates the "serving grant" as the scheduling grant in the "scheduling grant table 2" corresponding to the MIN ("scheduling grant (power ratio)"+2, 37) index; if the "scheduling grant (power ratio)" is greater than or equal to "2 step index threshold", then the terminal updates the "serving grant" as the scheduling grant in the "scheduling grant table 2" corresponding to the MIN ("scheduling grant (power ratio)"+1, 37) index; and when this serving relative grant is "DOWN", the terminal updates the "serving grant" as the scheduling grant in the "scheduling grant table 2" corresponding to the MAX ("scheduling grant (power ratio)"−1, 0) index;

when terminal receives one non-serving relative grant, the terminal determines the minimum power ratio greater than or equal to the maximum "reference recorded and stored power ratio" in the "scheduling grant table 2", determines the index number of the minimum power ratio in the "scheduling grant table 2" and marks the index number as "scheduling grant (recorded and stored power ratio)", wherein the "reference recorded and stored power ratio" is: a recorded and stored new value when the E-DPDCH/DPCCH power ratio selected by the E-TFC, for which the previous one transmission time interval with the same HARQ process as that of the current data transmission is used, is updated to the new value. For example, when this non-serving relative grant is "DOWN", then the terminal updates the "serving grant" as the scheduling grant in the "scheduling grant table 2" corresponding to MAX ("scheduling grant (recorded and stored power ratio)"−1, 0) index.

Hereinafter, the above grant processing method for a terminal will be further described in detail in conjunction with particular embodiments.

The embodiment I of the present invention is as shown in FIG. 1, and the particular processing flow is as follows:

in step 101, the RNC sends a RRC layer control signaling to the terminal, and the signaling carries indication information about the terminal carrying out the 16QAM operation, carries table selection information about selecting "absolute grant value mapping relationship table 1", carries that the "3 step index threshold" parameter is index 3 and carries that the "2 step index threshold" parameter is index 20.

In step 102, the terminal receives the signaling and analyzes it.

The signaling carries indication information about the terminal carrying out the 16QAM operation, so the terminal carries out the 16QAM operation; the signaling carries table selection information about selecting "absolute grant value mapping relationship table 1", then the terminal uses the "absolute grant value mapping relationship table 1" to map the absolute grant; and the terminal obtains the information that the "3 step index threshold" parameter is index 3, and the "2 step index threshold" parameter is index 20.

In the 103, when the terminal carries out the 16QAM operation, the terminal uses the "absolute grant value mapping relationship table 1" to map the absolute grant and the terminal uses the "scheduling grant table 1" to update the "serving grant". The "3 step index threshold" parameter and the "2 step index threshold" parameter correspond to the indexes in the "scheduling grant table 1".

In step 104, the "reference power ratio" is the E-DPDCH/DPCCH power ratio selected by E-TFC for which previous one transmission time interval with the same HARQ process as that of current data transmission is used, which is $(168/15)^2$. The terminal determines that the minimum power ratio greater than or equal to the "reference power ratio" $(168/15)^2$ in the "scheduling grant table 1" is $(168/15)^2$, determines that the index number of the minimum power ratio $(168/15)^2$ in the "scheduling grant table 1" is 29, and marks the index number as "scheduling grant (power ratio)".

In step 105, the terminal receives one serving relative grant (cell dedicated channel state or cell forward access channel state after conflict resolution) which is "UP", and the terminal judges that the "scheduling grant (power ratio)" (the value thereof is index 29) is greater than or equal to the "2 step index threshold" (the value thereof is index 20), so the terminal updates the "serving grant" as the scheduling grant in the "scheduling grant table 1" corresponding to the MIN ("scheduling grant (power ratio)"+1, 37) index. MIN ("scheduling grant (power ratio)"+1, 37)=MIN (29+1, 37)=MIN (30, 37)=30. The scheduling grant in the "scheduling grant table 1" corresponding to index 30 is $(95/15)^2 \times 4$. The terminal updates the "serving grant" as $(95/15)^2 \times 4$.

Figure 2:
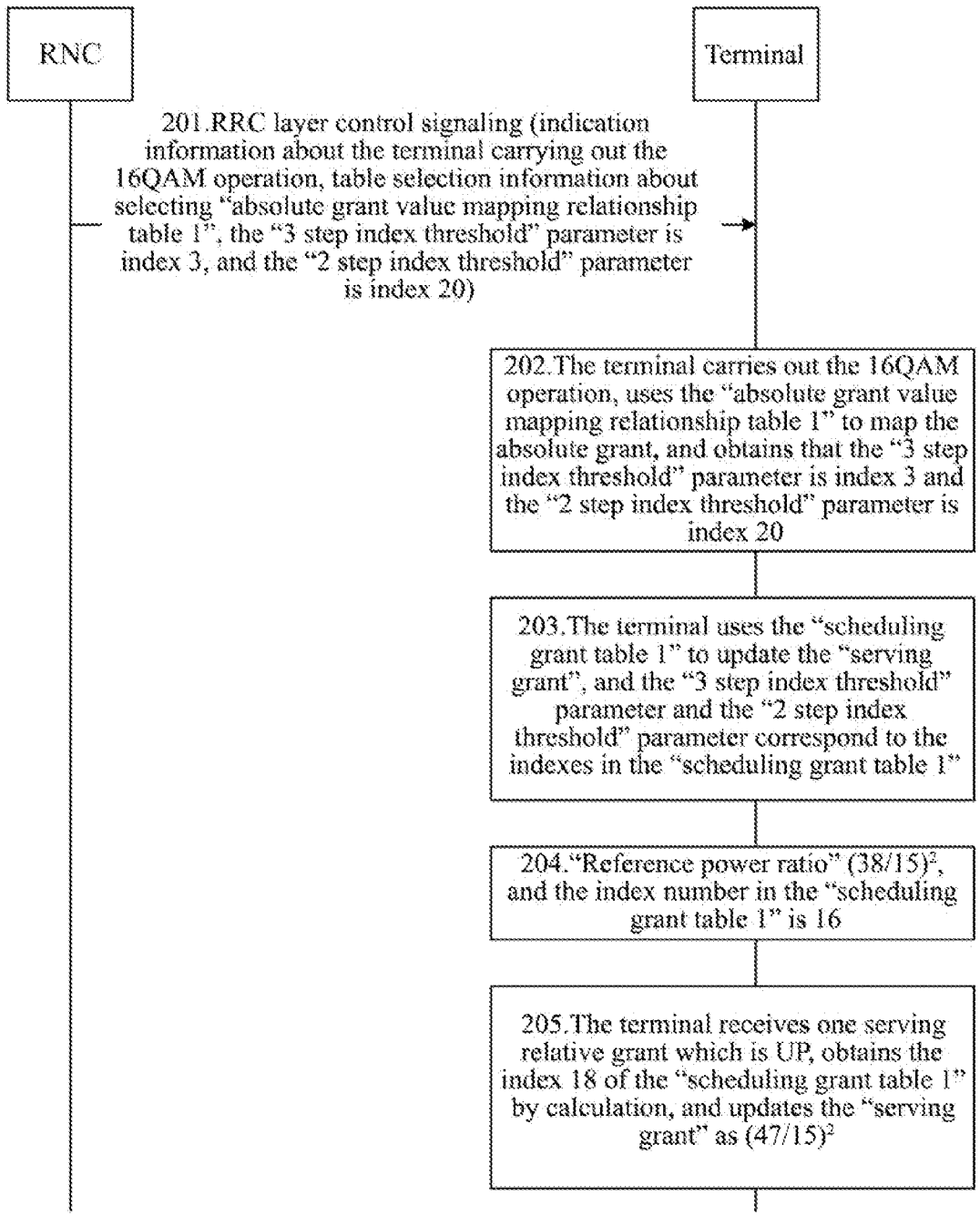
FIG. 2 is a flowchart of a grant processing method for a terminal in embodiment II of the present invention.

The embodiment II of the present invention is as shown in FIG. 2, and the particular processing flow is as follows:

in step 201, the RNC sends a RRC layer control signaling to the terminal, and the signaling carries indication information about the terminal carrying out the 16QAM operation, carries table selection information about selecting "absolute grant value mapping relationship table 1", carries that the "3 step index threshold" parameter is index 3 and carries that the "2 step index threshold" parameter is index 20.

In step 202, the terminal receives the signaling and analyzes it.

The signaling carries indication information about the terminal carrying out the 16QAM operation, so the terminal carries out the 16QAM operation; the signaling carries table selection information about selecting "absolute grant value mapping relationship table 1", then the terminal uses the "absolute grant value mapping relationship table 1" to map the absolute grant; and the terminal obtains the information that the "3 step index threshold" parameter is index 3 and the "2 step index threshold" parameter is index 20.

In step 203, when the terminal carries out the 16QAM operation, the terminal uses the "absolute grant value mapping relationship table 1" to map the absolute grant and the terminal uses the "scheduling grant table 1" to update the "serving grant". The "3 step index threshold" parameter and the "2 step index threshold" parameter correspond to the indexes in the "scheduling grant table 1".

In step 204, the "reference power ratio" is the E-DPDCH/DPCCH power ratio selected by E-TFC for which previous one transmission time interval with the same HARQ process as that of current data transmission is used, which is $(38/15)^2$. The terminal determines that the minimum power ratio greater than or equal to the "reference power ratio" $(38/15)^2$ in the "scheduling grant table 1" is $(38/15)^2$, determines that the index number of the minimum power ratio $(38/15)^2$ in the "scheduling grant table 1" is 16, and marks the index number as "scheduling grant (power ratio)".

In step 205, the terminal receives one serving relative grant (cell dedicated channel state or cell forward access channel state after conflict resolution) which is "UP", and the terminal judges that the "scheduling grant (power ratio)" (the value thereof is index 16) is less than the "2 step index threshold" (the value thereof is index 20) and greater than or equal to "3 step index threshold" (the value thereof is index 3), so the terminal updates the "serving grant" as the scheduling grant in the "scheduling grant table 1" corresponding to the MIN ("scheduling grant (power ratio)"+2, 37) index. MIN ("scheduling grant (power ratio)"+2, 37)=MIN (16+2, 37)=MIN (18, 37)=18. The scheduling grant in the "scheduling grant table 1" corresponding to index 18 is $(47/15)^2$. The terminal updates the "serving grant" as $(47/15)^2$.

Figure 3:
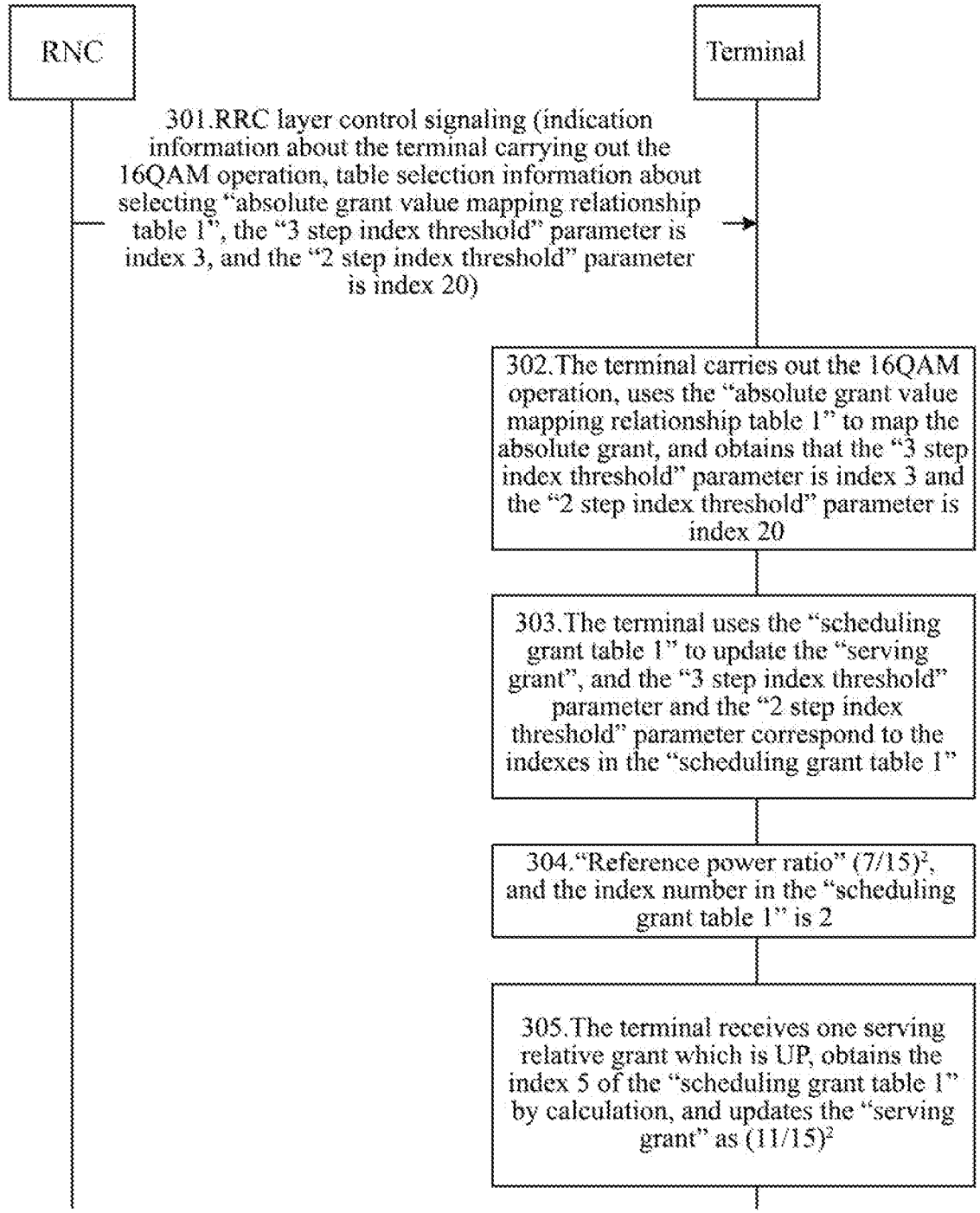
FIG. 3 is a flowchart of a grant processing method for a terminal in embodiment III of the present invention.

The embodiment III of the present invention is as shown in FIG. 3, and the particular processing flow is as follows:

in step 301, the RNC sends a RRC layer control signaling to the terminal, and the signaling carries indication information about the terminal carrying out the 16QAM operation, carries table selection information about selecting "absolute grant value mapping relationship table 1", carries that the "3 step index threshold" parameter is index 3 and carries that the "2 step index threshold" parameter is index 20.

In step 302, the terminal receives the signaling and analyzes it.

The signaling carries indication information about the terminal carrying out the 16QAM operation, so the terminal carries out the 16QAM operation; the signaling carries table selection information about selecting "absolute grant value mapping relationship table 1", then the terminal uses the "absolute grant value mapping relationship table 1" to map the absolute grant; and the terminal obtains the information that the "3 step index threshold" parameter is index 3 and the "2 step index threshold" parameter is index 20.

In the 303, when the terminal carries out the 16QAM operation, the terminal uses the "absolute grant value mapping relationship table 1" to map the absolute grant and the terminal uses the "scheduling grant table 1" to update the "serving grant". The "3 step index threshold" parameter and the "2 step index threshold" parameter correspond to the indexes in the "scheduling grant table 1".

In step 304, the "reference power ratio" is the E-DPDCH/DPCCH power ratio selected by E-TFC for which previous one transmission time interval with the same HARQ process as that of this data transmission is used, which is $(7/15)^2$. The terminal determines that the minimum power ratio greater than or equal to the "reference power ratio" $(7/15)^2$ in the "scheduling grant table 1" is $(7/15)^2$, determines that the index number of the minimum power ratio $(7/15)^2$ in the "scheduling grant table 1" is 2, and marks the index number as "scheduling grant (power ratio)".

In step 305, the terminal receives one serving relative grant (cell dedicated channel state or cell forward access channel state after conflict resolution) which is "UP", and the terminal judges that the "scheduling grant (power ratio)" (the value thereof is index 2) is less than the "3 step index threshold" (the value thereof is index 3), so the terminal updates the "serving grant" as the scheduling grant in the "scheduling grant table 1" corresponding to the MIN ("scheduling grant (power ratio)"+3, 37) index. MIN ("scheduling grant (power ratio)"+3, 37)=MIN (2+3, 37)=MIN (5, 37)=5. The scheduling grant in the "scheduling grant table 1" corresponding to index 5 is $(11/15)^2$. The terminal updates the "serving grant" as $(11/15)^2$.

Figure 4:
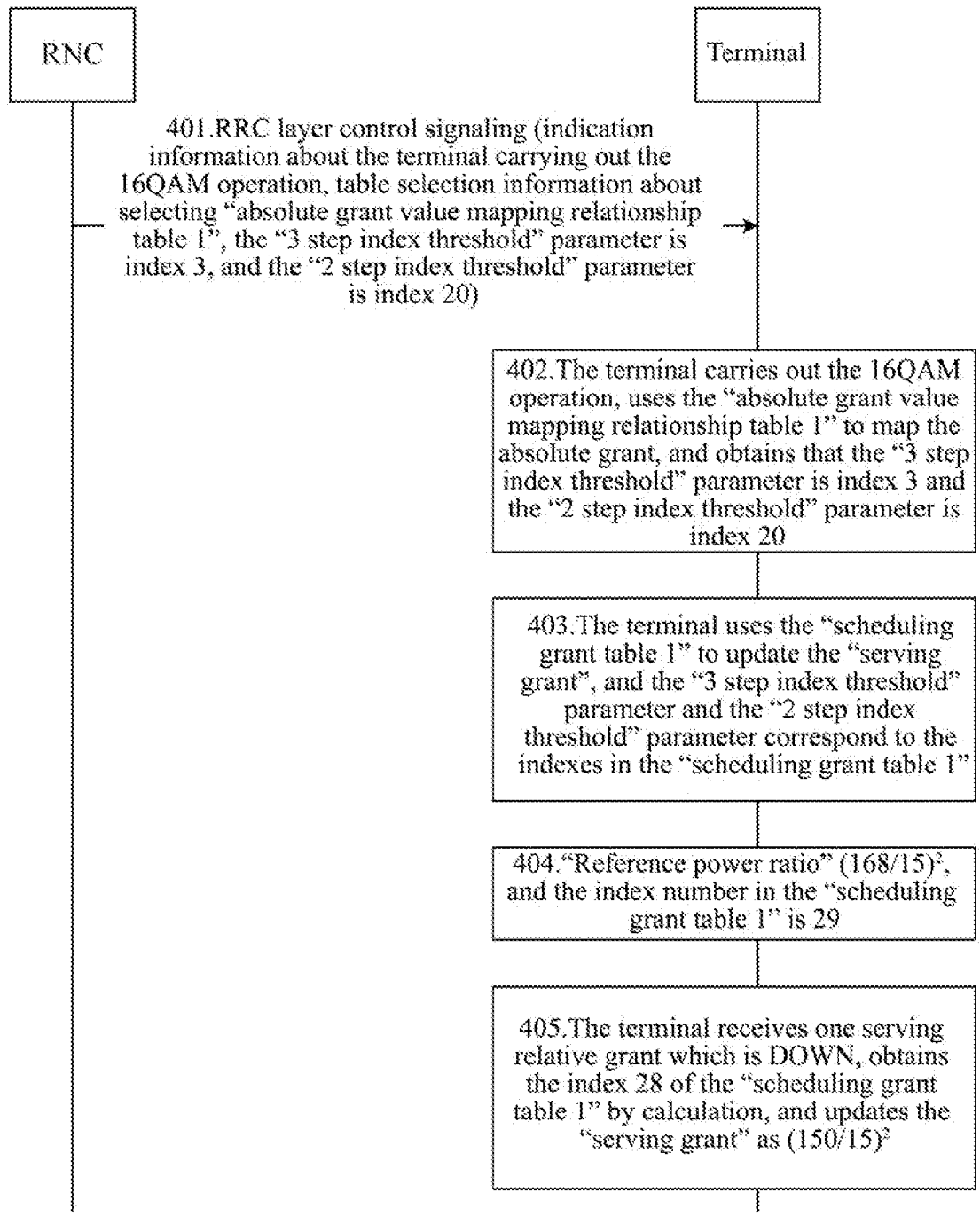
FIG. 4 is a flowchart of a grant processing method for a terminal in embodiment IV of the present invention.

The embodiment IV of the present invention is as shown in FIG. 4, and the particular processing flow is as follows:

in step 401, the RNC sends a RRC layer control signaling to the terminal, and the signaling carries indication information about the terminal carrying out the 16QAM operation, carries table selection information about selecting "absolute grant value mapping relationship table 1", carries that the "3 step index threshold" parameter is index 3 and carries that the "2 step index threshold" parameter is index 20.

In step 402, the terminal receives the signaling and analyzes it.

The signaling carries indication information about the terminal carrying out the 16QAM operation, so the terminal carries out the 16QAM operation; the signaling carries table selection information about selecting "absolute grant value mapping relationship table 1", then the terminal uses the "absolute grant value mapping relationship table 1" to map the absolute grant; and the terminal obtains the information that the "3 step index threshold" parameter is index 3 and the "2 step index threshold" parameter is index 20.

In the 403, when the terminal carries out the 16QAM operation, the terminal uses the "absolute grant value mapping relationship table 1" to map the absolute grant and the terminal uses the "scheduling grant table 1" to update the "serving grant". The "3 step index threshold" parameter and the "2 step index threshold" parameter correspond to the indexes in the "scheduling grant table 1".

In step 404, the "reference power ratio" is the E-DPDCH/DPCCH power ratio selected by E-TFC for which previous one transmission time interval with the same HARQ process as that of current data transmission is used, which is $(168/15)^2$. The terminal determines that the minimum power ratio greater than or equal to the "reference power ratio" $(168/15)^2$ in the "scheduling grant table 1" is $(168/15)^2$, determines that the index number of the minimum power ratio $(168/15)^2$ in the "scheduling grant table 1" is 29, and marks the index number as "scheduling grant (power ratio)".

In step 405, the terminal receives one serving relative grant (cell dedicated channel state or cell forward access channel state after conflict resolution) which is "DOWN", and the terminal updates the "serving grant" as the scheduling grant in the "scheduling grant table 1" corresponding to the MAX ("scheduling grant (power ratio)"−1, 0) index. MAX ("scheduling grant (power ratio)"−1, 0)=MAX (29−1, 0)=MAX (28, 0)=28. The scheduling grant in the "scheduling grant table 1" corresponding to index 28 is $(150/15)^2$. The terminal updates the "serving grant" as $(150/15)^2$.

Figure 5:
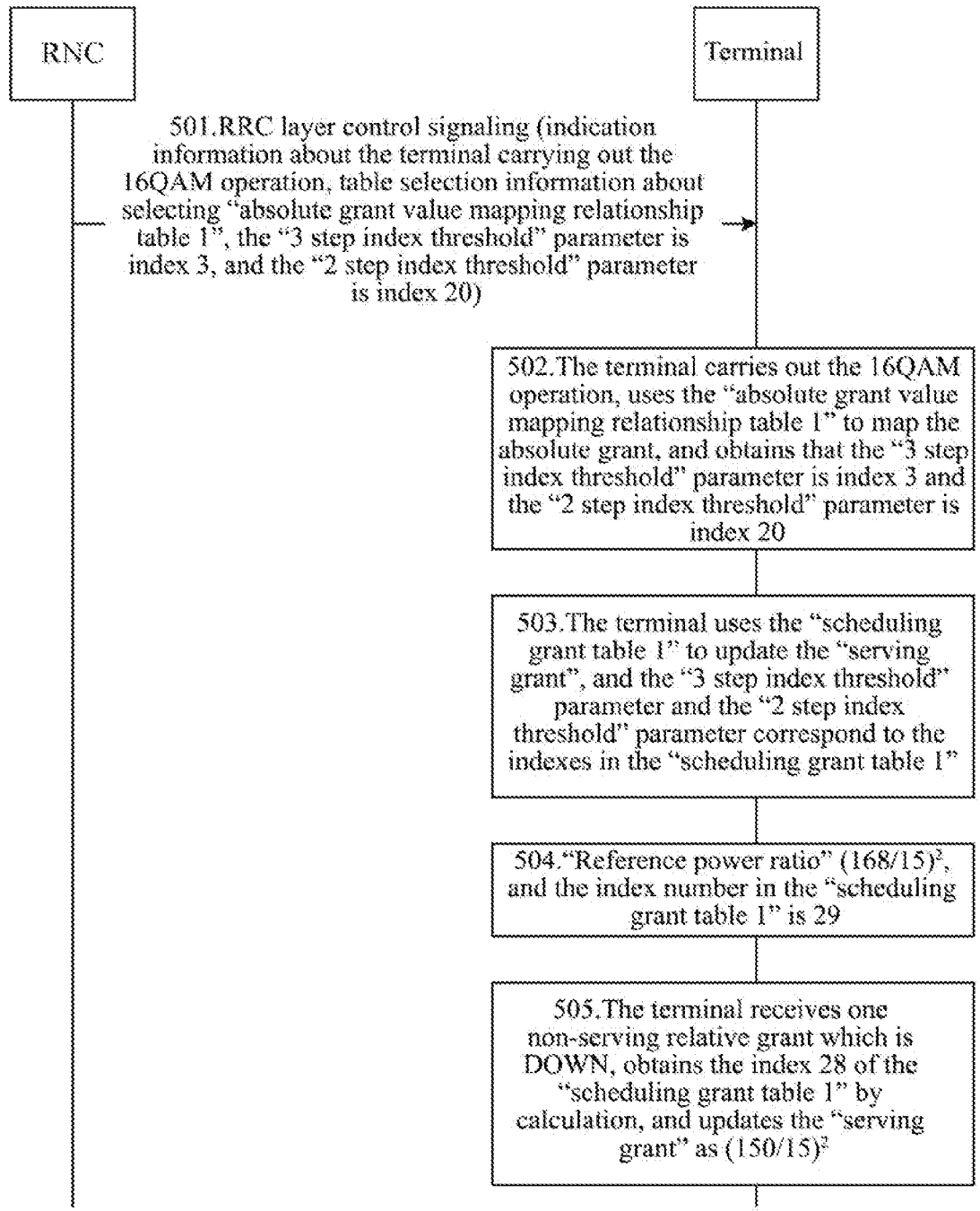
FIG. 5 is a flowchart of a grant processing method for a terminal in embodiment V of the present invention.

The embodiment V of the present invention is as shown in FIG. 5, and the particular processing flow is as follows:

in step 501, the RNC sends a RRC layer control signaling to the terminal, and the signaling carries indication information about the terminal carrying out the 16QAM operation, carries table selection information about selecting "absolute grant value mapping relationship table 1", carries that the "3 step index threshold" parameter is index 3 and carries that the "2 step index threshold" parameter is index 20.

In step 502, the terminal receives the signaling and analyzes it.

The signaling carries indication information about the terminal carrying out the 16QAM operation, so the terminal carries out the 16QAM operation; the signaling carries table selection information about selecting "absolute grant value mapping relationship table 1", then the terminal uses the "absolute grant value mapping relationship table 1" to map the absolute grant; and the terminal obtains the information that the "3 step index threshold" parameter is index 3 and the "2 step index threshold" parameter is index 20.

In the 503, when the terminal carries out the 16QAM operation, the terminal uses the "absolute grant value mapping relationship table 1" to map the absolute grant and the terminal uses the "scheduling grant table 1" to update the "serving grant". The "3 step index threshold" parameter and the "2 step index threshold" parameter correspond to the indexes in the "scheduling grant table 1".

In step 504, the "reference recorded and stored power ratio" is a recorded and stored new value when the E-DPDCH/DPCCH power ratio selected by the E-TFC, for which the previous one transmission time interval with the same HARQ process as that of the current data transmission is used, is updated to the new value, and the maximum "reference recorded and stored power ratio" is $(168/15)^2$. The terminal determines that the minimum power ratio greater than or equal to the maximum "reference recorded and stored power ratio" $(168/15)^2$ in the "scheduling grant table 1" is $(168/15)^2$, determines that the index number of the minimum power ratio $(168/15)^2$ in the "scheduling grant table 1" is 29, and marks the index number as "scheduling grant (recorded and stored power ratio)".

In step 505, when the terminal receives one non-serving relative grant which is "DOWN", then the terminal updates the "serving grant" as the scheduling grant in the "scheduling grant table 1" corresponding to MAX ("scheduling grant (recorded and stored power ratio)"−1, 0) index. MAX ("scheduling grant (recorded and stored power ratio)"−1, 0)=MAX (29−1, 0)=MAX (28, 0)=28. The scheduling grant in the "scheduling grant table 1" corresponding to index 28 is $(150/15)^2$. The terminal updates the "serving grant" as $(150/15)^2$.

Figure 6:
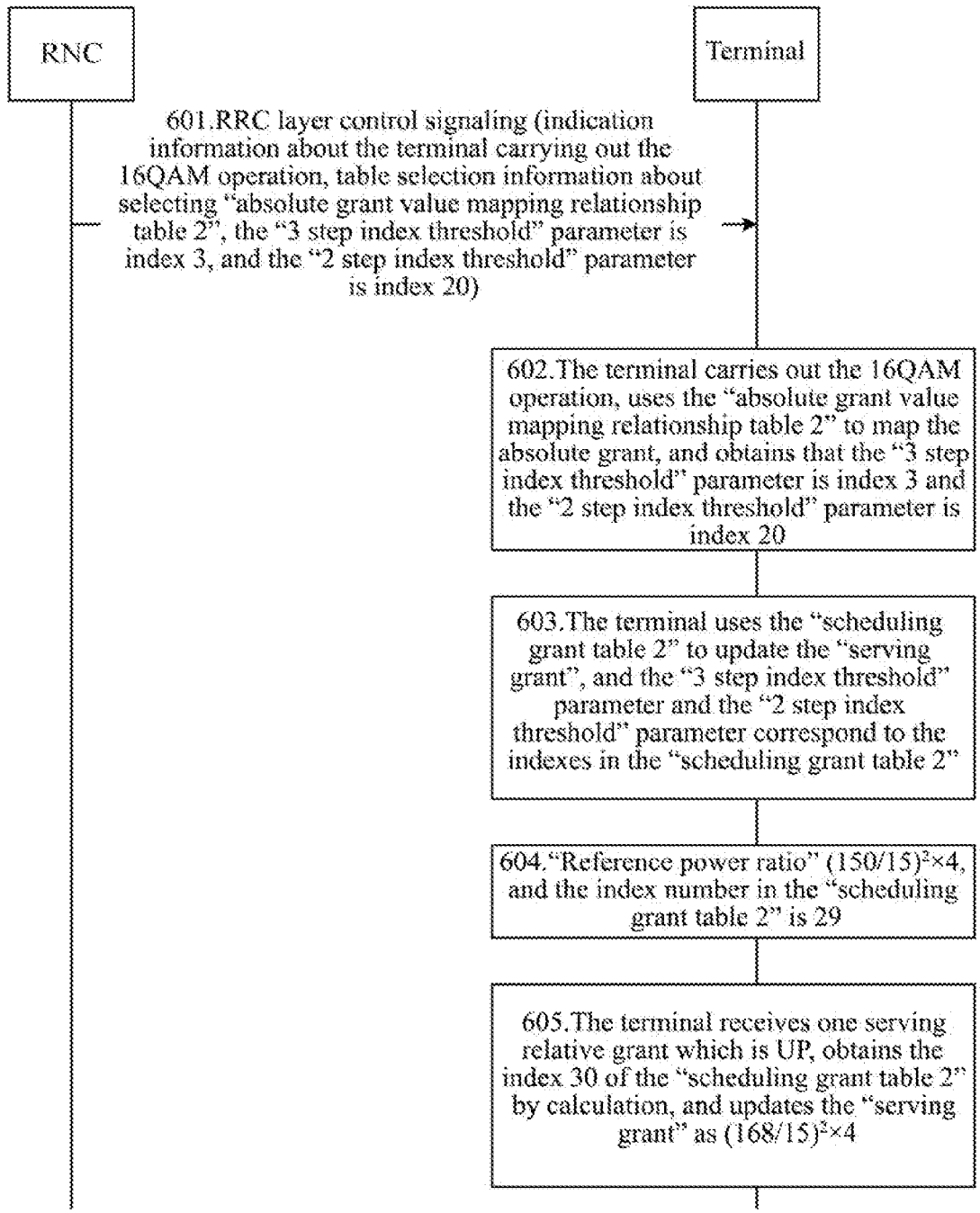
FIG. 6 is a flowchart of a grant processing method for a terminal in embodiment VI of the present invention.

The embodiment VI of the present invention is as shown in FIG. 6, and the particular processing flow is as follows:

in step 601, the RNC sends a RRC layer control signaling to the terminal, and the signaling carries indication information about the terminal carrying out the 16QAM operation, carries table selection information about selecting "absolute grant value mapping relationship table 2", carries that the "3 step index threshold" parameter is index 3 and carries that the "2 step index threshold" parameter is index 20.

In step 602, the terminal receives the signaling and analyzes it.

This signaling carries indication information about the terminal carrying out the 16QAM operation, so the terminal carries out the 16QAM operation; the signaling carries table selection information about selecting "absolute grant value mapping relationship table 2", then the terminal uses the "absolute grant value mapping relationship table 2" to map the absolute grant; and the terminal obtains the information that the "3 step index threshold" parameter is index 3 and the "2 step index threshold" parameter is index 20.

In step 603, when the terminal carries out the 16QAM operation, the terminal uses the "absolute grant value mapping relationship table 2" to map the absolute grant and the terminal uses the "scheduling grant table 2" to update the "serving grant". The "3 step index threshold" parameter and the "2 step index threshold" parameter correspond to the indexes in the "scheduling grant table 2".

In step 604, the "reference power ratio" is the E-DPDCH/DPCCH power ratio selected by E-TFC for which previous one transmission time interval with the same HARQ process as that of current data transmission is used, which is $(150/15)^2 \times 4$. The terminal determines that the minimum power ratio greater than or equal to the "reference power ratio" $(150/15)^2 \times 4$ in the "scheduling grant table 2" is $(150/15)^2 \times 4$, determines that the index number of the minimum power ratio $(150/15)^2 \times 4$ in the "scheduling grant table 2" is 29, and marks the index number as "scheduling grant (power ratio)".

In step 605, the terminal receives one serving relative grant (cell dedicated channel state or cell forward access channel state after conflict resolution) which is "UP", and the terminal judges that the "scheduling grant (power ratio)" (the value thereof is index 29) is greater than or equal to the "2 step index threshold" (the value thereof is index 20), so the terminal updates the "serving grant" as the scheduling grant in the "scheduling grant table 2" corresponding to the MIN ("scheduling grant (power ratio)"+1, 37) index. MIN ("scheduling grant (power ratio)"+1, 37)=MIN (29+1, 37)=MIN (30, 37)=30. The scheduling grant in the "scheduling grant table 2" corresponding to index 30 is $(168/15)^2 \times 4$." The terminal updates the "serving grant" as $(168/15)^2 \times 4$.

Figure 7:
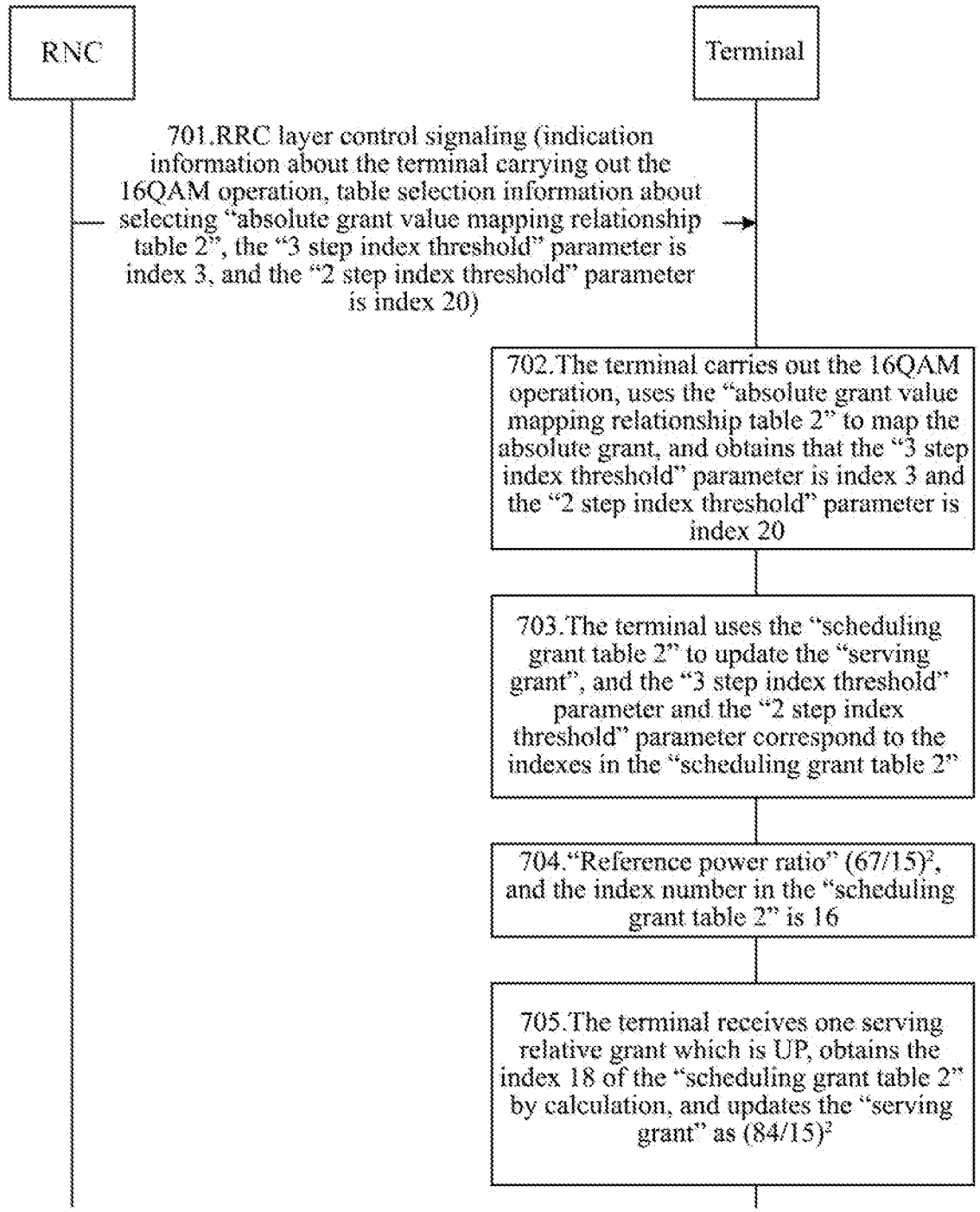
FIG. 7 is a flowchart of a grant processing method for a terminal in embodiment VII of the present invention.

The embodiment VII of the present invention is as shown in FIG. 7, and the particular processing flow is as follows:

in step 701, the RNC sends a RRC layer control signaling to the terminal, and the signaling carries indication information about the terminal carrying out the 16QAM operation, carries table selection information about selecting "absolute grant value mapping relationship table 2", carries that the "3 step index threshold" parameter is index 3 and carries that the "2 step index threshold" parameter is index 20.

In step 702, the terminal receives the signaling and analyzes it.

The signaling carries indication information about the terminal carrying out the 16QAM operation, so the terminal carries out the 16QAM operation; the signaling carries table selection information about selecting "absolute grant value mapping relationship table 2", then the terminal uses the "absolute grant value mapping relationship table 2" to map the absolute grant; and the terminal obtains the information that the "3 step index threshold" parameter is index 3 and the "2 step index threshold" parameter is index 20.

In the 703, when the terminal carries out the 16QAM operation, the terminal uses the "absolute grant value mapping relationship table 2" to map the absolute grant and the terminal uses the "scheduling grant table 2" to update the "serving grant". The "3 step index threshold" parameter and the "2 step index threshold" parameter correspond to the indexes in the "scheduling grant table 2".

In step 704, the "reference power ratio" is the E-DPDCH/DPCCH power ratio selected by E-TFC for which previous one transmission time interval with the same HARQ process as that of current data transmission is used, which is $(67/15)^2$. The terminal determines that the minimum power ratio greater than or equal to the "reference power ratio" $(67/15)^2$ in the "scheduling grant table 2" is $(67/15)^2$, determines that the index number of the minimum power ratio $(67/15)^2$ in the "scheduling grant table 2" is 16, and marks the index number as "scheduling grant (power ratio)".

In step 705, the terminal receives one serving relative grant (cell dedicated channel state or cell forward access channel state after conflict resolution) which is "UP", and the terminal judges that the "scheduling grant (power ratio)" (the value thereof is index 16) is less than the "2 step index threshold" (the value thereof is index 20) and greater than or equal to "3 step index threshold" (the value thereof is index 3), so the terminal updates the "serving grant" as the scheduling grant in the "scheduling grant table 2" corresponding to the MIN ("scheduling grant (power ratio)"+2, 37) index. MIN ("scheduling grant (power ratio)"+2, 37)=MIN (16+2, 37)=MIN (18, 37)=18. The scheduling grant in the "scheduling grant table 2" corresponding to index 18 is $(84/15)^2$. The terminal updates the "serving grant" as $(84/15)^2$.

Figure 8:
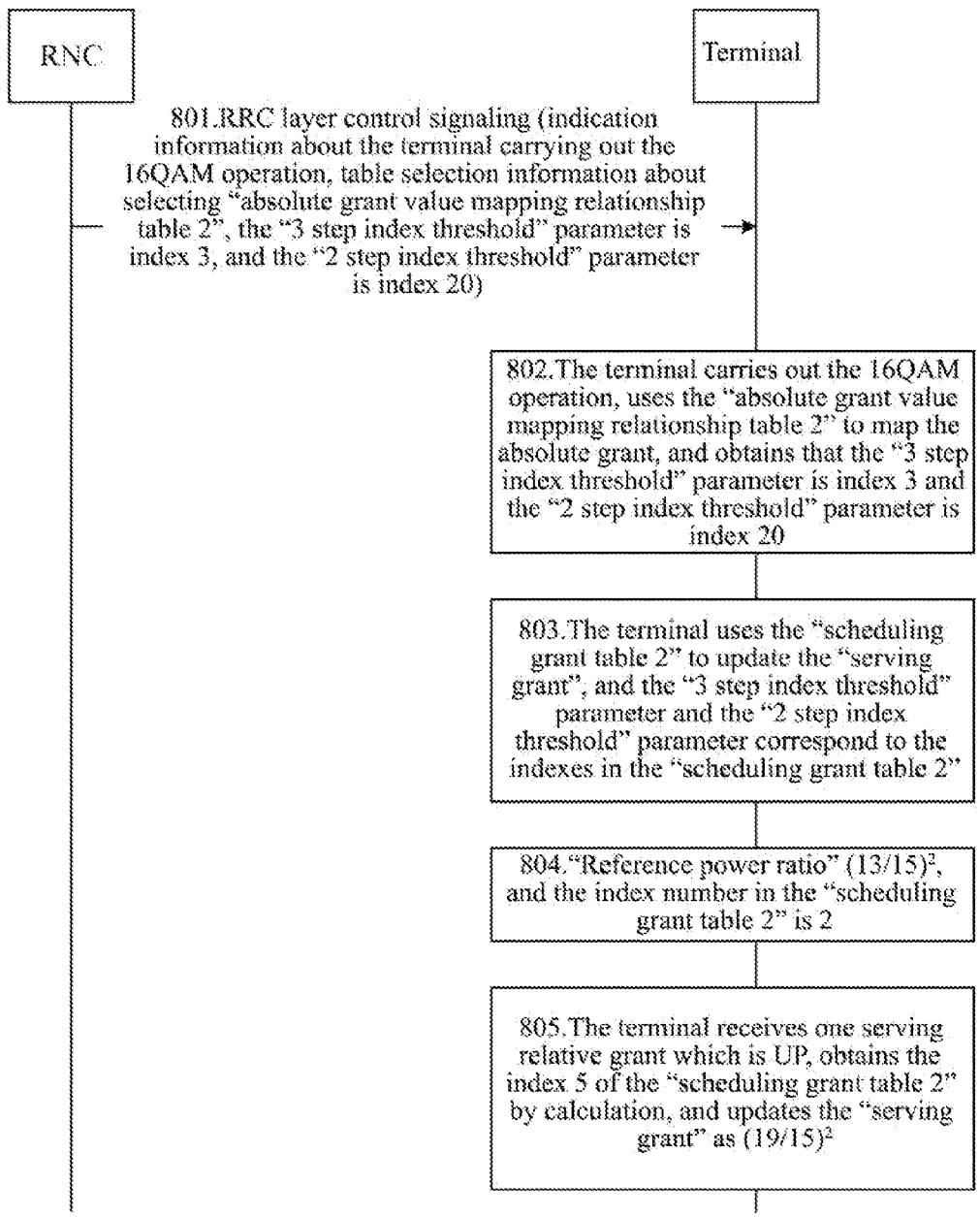
FIG. 8 is a flowchart of a grant processing method for a terminal in embodiment VIII of the present invention.

The embodiment VIII of the present invention is as shown in FIG. 8, and the particular processing flow is as follows:

in step 801, the RNC sends a RRC layer control signaling to the terminal, and the signaling carries indication information about the terminal carrying out the 16QAM operation, carries table selection information about selecting "absolute grant value mapping relationship table 2", carries that the "3 step index threshold" parameter is index 3 and carries that the "2 step index threshold" parameter is index 20.

In step 802, the terminal receives the signaling and analyzes it.

The signaling carries indication information about the terminal carrying out the 16QAM operation, so the terminal carries out the 16QAM operation; the signaling carries table selection information about selecting "absolute grant value mapping relationship table 2", then the terminal uses the "absolute grant value mapping relationship table 2" to map the absolute grant; and the terminal obtains the information that the "3 step index threshold" parameter is index 3 and the "2 step index threshold" parameter is index 20.

In step 803, when the terminal carries out the 16QAM operation, the terminal uses the "absolute grant value mapping relationship table 2" to map the absolute grant and the terminal uses the "scheduling grant table 2" to update the "serving grant". The "3 step index threshold" parameter and the "2 step index threshold" parameter correspond to the indexes in the "scheduling grant table 2".

In step 804, the "reference power ratio" is the E-DPDCH/DPCCH power ratio selected by E-TFC for which previous one transmission time interval with the same HARQ process as that of current data transmission is used, which is $(13/15)^2$. The terminal determines that the minimum power ratio greater than or equal to the "reference power ratio" $(13/15)^2$ in the "scheduling grant table 2" is $(13/15)^2$, determines that the index number of the minimum power ratio $(13/15)^2$ in the "scheduling grant table 2" is 2, and marks the index number as "scheduling grant (power ratio)".

In step 805, the terminal receives one serving relative grant (cell dedicated channel state or cell forward access channel state after conflict resolution) which is "UP", and the terminal judges that the "scheduling grant (power ratio)" (the value thereof is index 2) is less than the "3 step index threshold" (the value thereof is index 3), so the terminal updates the "serving grant" as the scheduling grant in the "scheduling grant table 2" corresponding to the MIN ("scheduling grant (power ratio)"+3, 37) index. MIN ("scheduling grant (power ratio)"+3, 37)=MIN (2+3, 37)=MIN (5, 37)=5. The scheduling grant in the "scheduling grant table 2" corresponding to index 5 is $(19/15)^2$. The terminal updates the "serving grant" as $(19/15)^2$.

Figure 9:
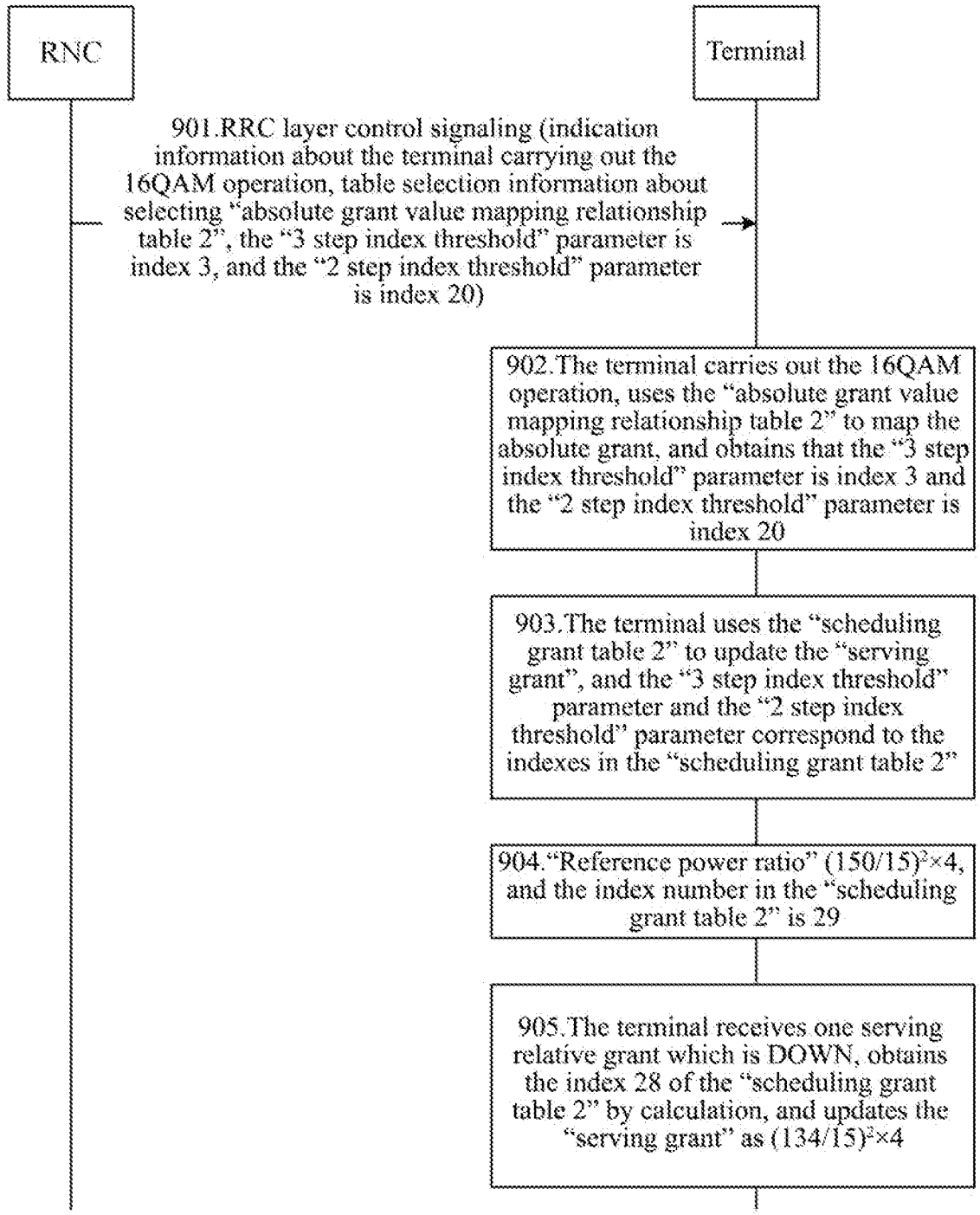
FIG. 9 is a flowchart of a grant processing method for a terminal in embodiment IX of the present invention.

The embodiment IX of the present invention is as shown in FIG. 9, and the particular processing flow is as follows:

in step 901, the RNC sends a RRC layer control signaling to the terminal, and the signaling carries indication information about the terminal carrying out the 16QAM operation, carries table selection information about selecting "absolute grant value mapping relationship table 2", carries that the "3 step index threshold" parameter is index 3 and carries that the "2 step index threshold" parameter is index 20.

In step 902, the terminal receives the signaling and analyzes it.

The signaling carries indication information about the terminal carrying out the 16QAM operation, so the terminal carries out the 16QAM operation; the signaling carries table selection information about selecting "absolute grant value mapping relationship table 2", then the terminal uses the "absolute grant value mapping relationship table 2" to map the absolute grant; and the terminal obtains the information that the "3 step index threshold" parameter is index 3 and the "2 step index threshold" parameter is index 20.

In the 903, when the terminal carries out the 16QAM operation, the terminal uses the "absolute grant value mapping relationship table 2" to map the absolute grant and the terminal uses the "scheduling grant table 2" to update the "serving grant". The "3 step index threshold" parameter and the "2 step index threshold" parameter correspond to the indexes in the "scheduling grant table 2".

In step 904, the "reference power ratio" is the E-DPDCH/DPCCH power ratio selected by E-TFC for which previous one transmission time interval with the same HARQ process as that of current data transmission is used, which is $(150/15)^2 \times 4$. The terminal determines that the minimum power ratio greater than or equal to the "reference power ratio" $(150/15)^2 \times 4$ in the "scheduling grant table 2" is $(150/15)^2 \times 4$, determines that the index number of the minimum power ratio $(150/15)^2$ in the "scheduling grant table 2" is 29, and marks the index number as "scheduling grant (power ratio)".

In step 905, the terminal receives one serving relative grant (cell dedicated channel state or cell forward access channel state after conflict resolution) which is "DOWN", and the terminal updates the "serving grant" as the scheduling grant in the "scheduling grant table 2" corresponding to the MAX ("scheduling grant (power ratio)"−1, 0) index. MAX ("scheduling grant (power ratio)"−1, 0)=MAX (29−1, 0)=MAX (28, 0)=28. The scheduling grant in the "scheduling grant table 2" corresponding to index 28 is $(134/15)^2 \times 4$. The terminal updates the "serving grant" as $(134/15)^2 \times 4$.

Figure 10:
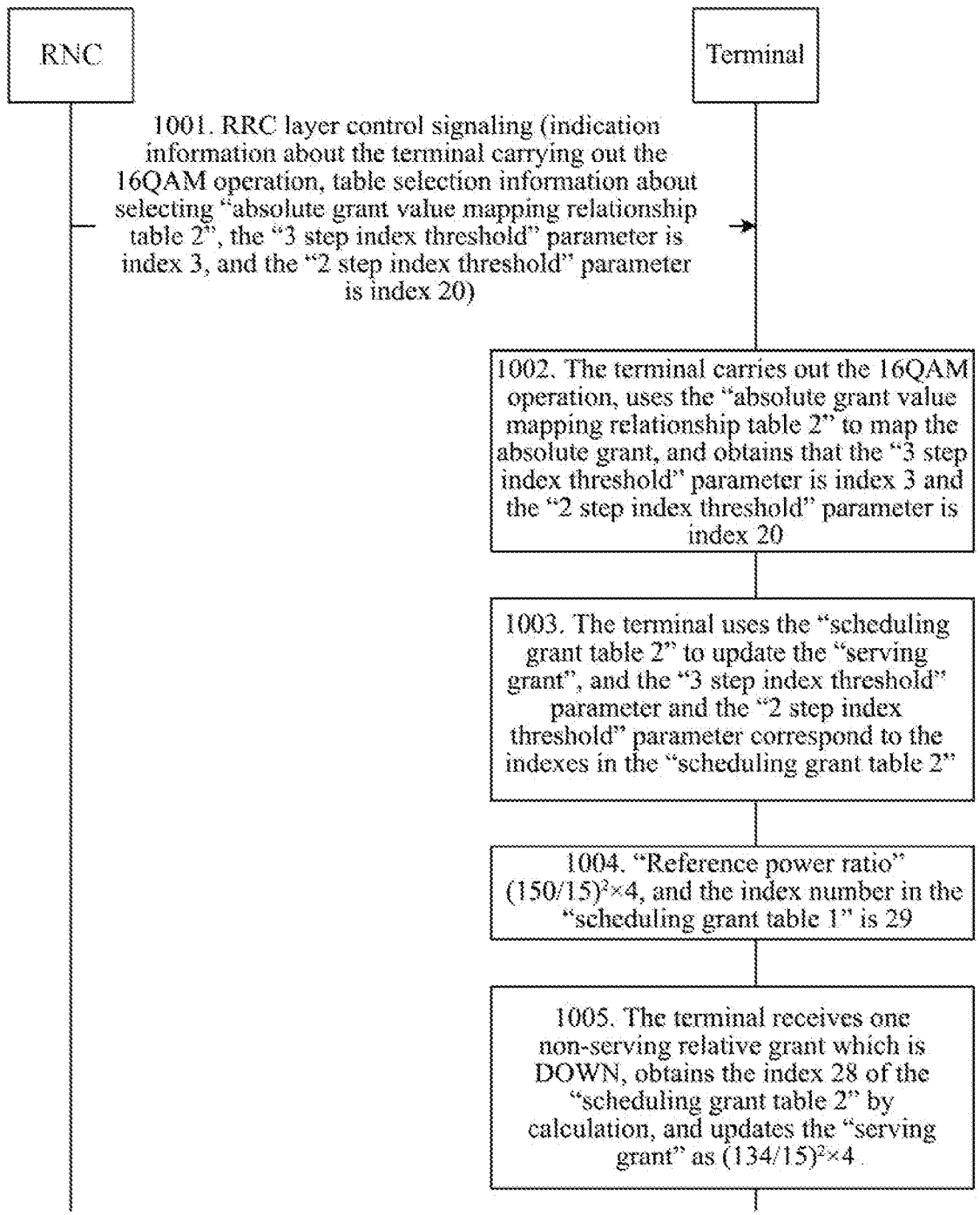
FIG. 10 is a flowchart of a grant processing method for a terminal in embodiment X of the present invention.

The embodiment X of the present invention is as shown in FIG. 10, and the particular processing flow is as follows:

in step 1001, the RNC sends a RRC layer control signaling to the terminal, and the signaling carries indication information about the terminal carrying out the 16QAM operation, carries table selection information about selecting "absolute grant value mapping relationship table 2", carries that the "3 step index threshold" parameter is index 3 and carries that the "2 step index threshold" parameter is index 20.

In step 1002, the terminal receives the signaling and analyzes it.

The signaling carries indication information about the terminal carrying out the 16QAM operation, so the terminal carries out the 16QAM operation; the signaling carries table selection information about selecting "absolute grant value mapping relationship table 2", then the terminal uses the "absolute grant value mapping relationship table 2" to map the absolute grant; and the terminal obtains the information that the "3 step index threshold" parameter is index 3 and the "2 step index threshold" parameter is index 20.

In the 1003, when the terminal carries out the 16QAM operation, the terminal uses the "absolute grant value mapping relationship table 2" to map the absolute grant and the terminal uses the "scheduling grant table 2" to update the "serving grant". The "3 step index threshold" parameter and the "2 step index threshold" parameter correspond to the indexes in the "scheduling grant table 2".

In step 1004, the "reference recorded and stored power ratio" is a recorded and stored new value when the E-DPDCH/DPCCH power ratio selected by the E-TFC, for which the previous one transmission time interval with the same HARQ process as that of the current data transmission is used, is updated to the new value, and the maximum "reference recorded and stored power ratio" is $(150/15)^2 \times 4$. The terminal determines that the minimum power ratio greater than or equal to the maximum "reference recorded and stored power ratio" $(150/15)^2 \times 4$ in the "scheduling grant table 2" is $(150/15)^2 \times 4$, determines that the index number of the minimum power ratio $(150/15)^2 \times 4$ in the "scheduling grant table 2" is 29, and marks the index number as "scheduling grant (recorded and stored power ratio)".

In step 1005, when the terminal receives one non-serving relative grant which is "DOWN", then the terminal updates the "serving grant" as the scheduling grant in the "scheduling grant table 2" corresponding to MAX ("scheduling grant (recorded and stored power ratio)"−1, 0) index. MAX ("scheduling grant (recorded and stored power ratio)"−1, 0)=MAX (29−1, 0)=MAX (28, 0)=28. The scheduling grant in the "scheduling grant table 2" corresponding to index 28 is $(134/15)^2 \times 4$. The terminal updates the "serving grant" as $(134/15)^2 \times 4$.

Figure 11:
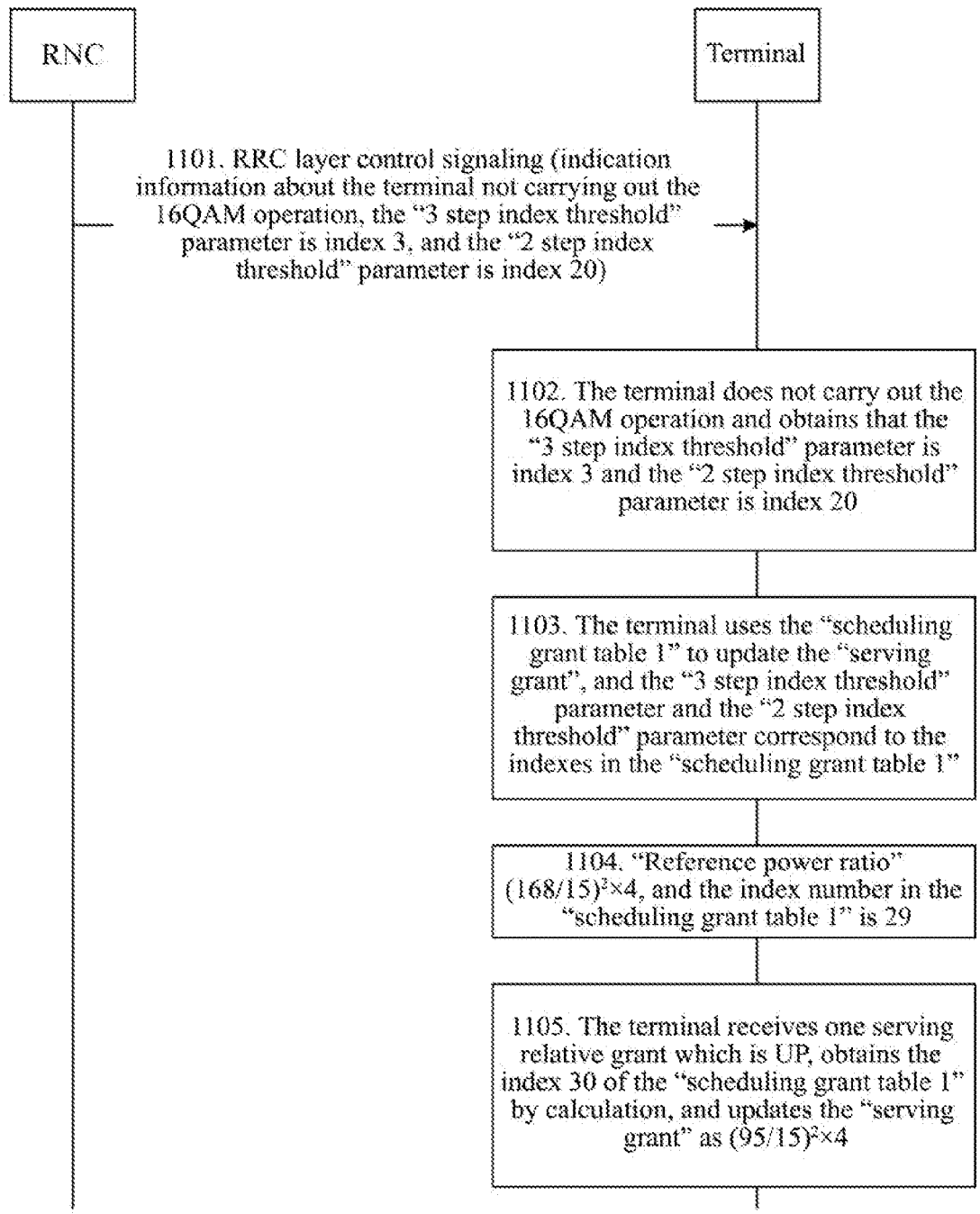
FIG. 11 is a flowchart of a grant processing method for a terminal in embodiment XI of the present invention.

The embodiment XI of the present invention is as shown in FIG. 11, and the particular processing flow is as follows:

in step 1101, the RNC sends a RRC layer control signaling to the terminal, and the signaling carries indication information about the terminal not carrying out the 16QAM operation, carries that the "3 step index threshold" parameter is index 3 and carries that the "2 step index threshold" parameter is index 20.

In step 1102, the terminal receives the signaling and analyzes it.

The signaling carries indication information about the terminal not carrying out the 16QAM operation, so the terminal does not carry out the 16QAM operation; and the terminal obtains the information that the "3 step index threshold" parameter is index 3 and the "2 step index threshold" parameter is index 20.

In the 1103, when the terminal does not carry out the 16QAM operation, the terminal uses the "absolute grant value mapping relationship table 1" to map the absolute grant and the terminal uses the "scheduling grant table 1" to update the "serving grant". The "3 step index threshold" parameter and the "2 step index threshold" parameter correspond to the indexes in the "scheduling grant table 1".

In step 1104, the "reference power ratio" is the E-DPDCH/DPCCH power ratio selected by E-TFC for which previous one transmission time interval with the same HARQ process as that of current data transmission is used, which is $(168/15)^2$. The terminal determines that the minimum power ratio greater than or equal to the "reference power ratio" $(168/15)^2$ in the "scheduling grant table 1" is $(168/15)^2$, determines that the index number of the minimum power ratio $(168/15)^2$ in the "scheduling grant table 1" is 29, and marks the index number as "scheduling grant (power ratio)".

In step 1105, the terminal receives one serving relative grant (cell dedicated channel state or cell forward access channel state after conflict resolution) which is "UP", and the terminal judges that the "scheduling grant (power ratio)" (the value thereof is index 29) is greater than or equal to the "2 step index threshold" (the value thereof is index 20), so the terminal updates the "serving grant" as the scheduling grant in the "scheduling grant table 1" corresponding to the MIN ("scheduling grant (power ratio)"+1, 37) index. MIN ("scheduling grant (power ratio)"+1, 37)=MIN (29+1, 37)=MIN (30, 37)=30. The scheduling grant in the "scheduling grant table 1" corresponding to index 30 is $(95/15)^2 \times 4$. The terminal updates the "serving grant" as $(95/15)^2 \times 4$.

Figure 12:
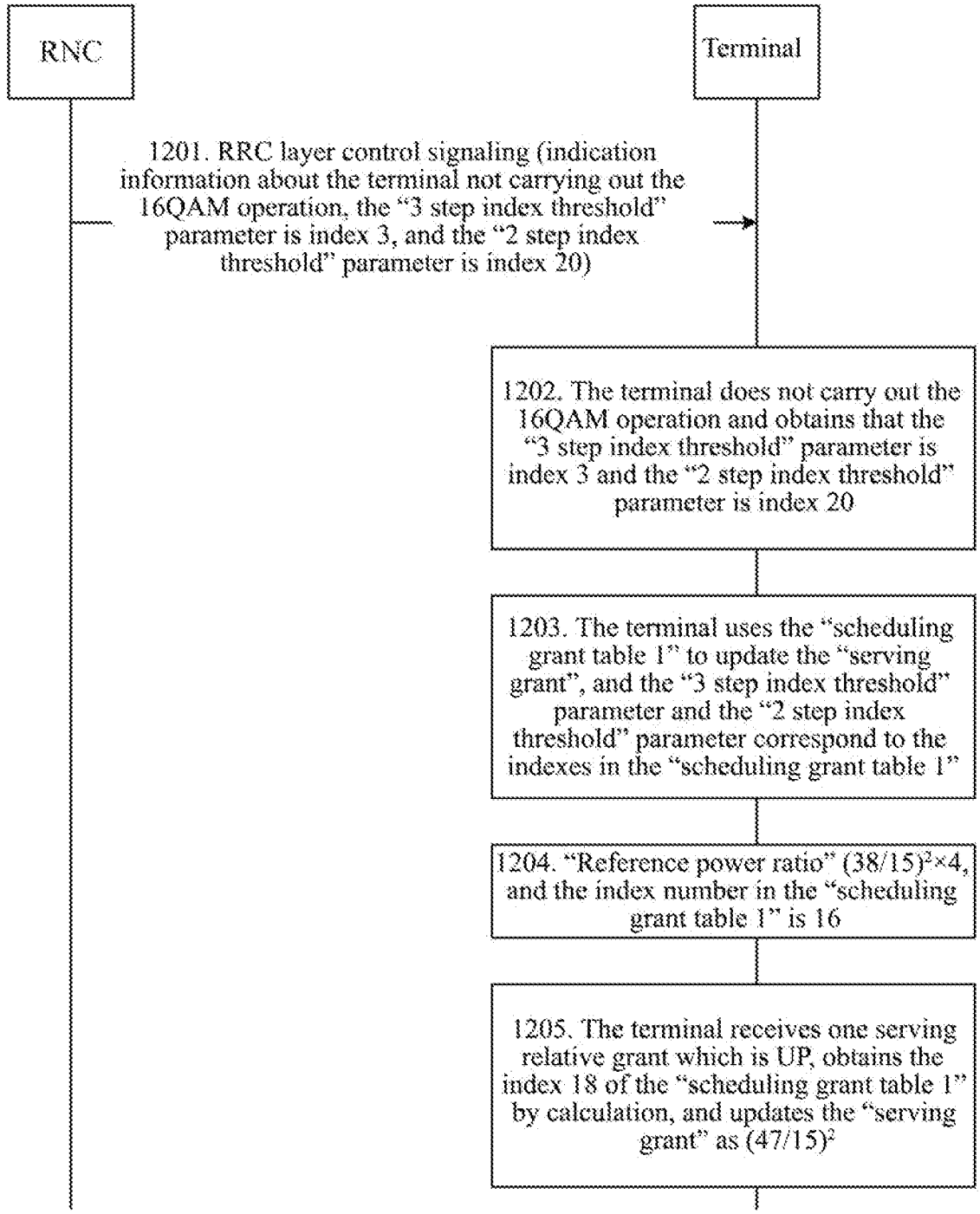
FIG. 12 is a flowchart of a grant processing method for a terminal in embodiment XII of the present invention.

The embodiment XII of the present invention is as shown in FIG. 12, and the particular processing flow is as follows:

in step 1201, the RNC sends a RRC layer control signaling to the terminal, and the signaling carries indication information about the terminal not carrying out the 16QAM operation, carries that the "3 step index threshold" parameter is index 3 and carries that the "2 step index threshold" parameter is index 20.

In step 1202, the terminal receives the signaling and analyzes it.

The signaling carries indication information about the terminal not carrying out the 16QAM operation, so the terminal does not carry out the 16QAM operation; and the terminal obtains the information that the "3 step index threshold" parameter is index 3 and the "2 step index threshold" parameter is index 20.

In the 1203, when the terminal does not carry out the 16QAM operation, the terminal uses the "absolute grant value mapping relationship table 1" to map the absolute grant and the terminal uses the "scheduling grant table 1" to update the "serving grant". The "3 step index threshold" parameter and the "2 step index threshold" parameter correspond to the indexes in the "scheduling grant table 1".

In step 1204, the "reference power ratio" is the E-DPDCH/DPCCH power ratio selected by E-TFC for which previous one transmission time interval with the same HARQ process as that of current data transmission is used, which is $(38/15)^2$. The terminal determines that the minimum power ratio greater than or equal to the "reference power ratio" $(38/15)^2$ in the "scheduling grant table 1" is $(38/15)^2$, determines that the index number of the minimum power ratio $(38/15)^2$ in the "scheduling grant table 1" is 16, and marks the index number as "scheduling grant (power ratio)".

In step 1205, the terminal receives one serving relative grant (cell dedicated channel state or cell forward access channel state after conflict resolution) which is "UP", and the terminal judges that the "scheduling grant (power ratio)" (the value thereof is index 16) is less than the "2 step index threshold" (the value thereof is index 20) and greater than or equal to "3 step index threshold" (the value thereof is index 3), so the terminal updates the "serving grant" as the scheduling grant in the "scheduling grant table 1" corresponding to the MIN ("scheduling grant (power ratio)"+2, 37) index. MIN ("scheduling grant (power ratio)"+2, 37)=MIN (16+2, 37)=MIN (18, 37)=18. The scheduling grant in the "scheduling grant table 1" corresponding to index 18 is $(47/15)^2$. The terminal updates the "serving grant" as $(47/15)^2$.

Figure 13:
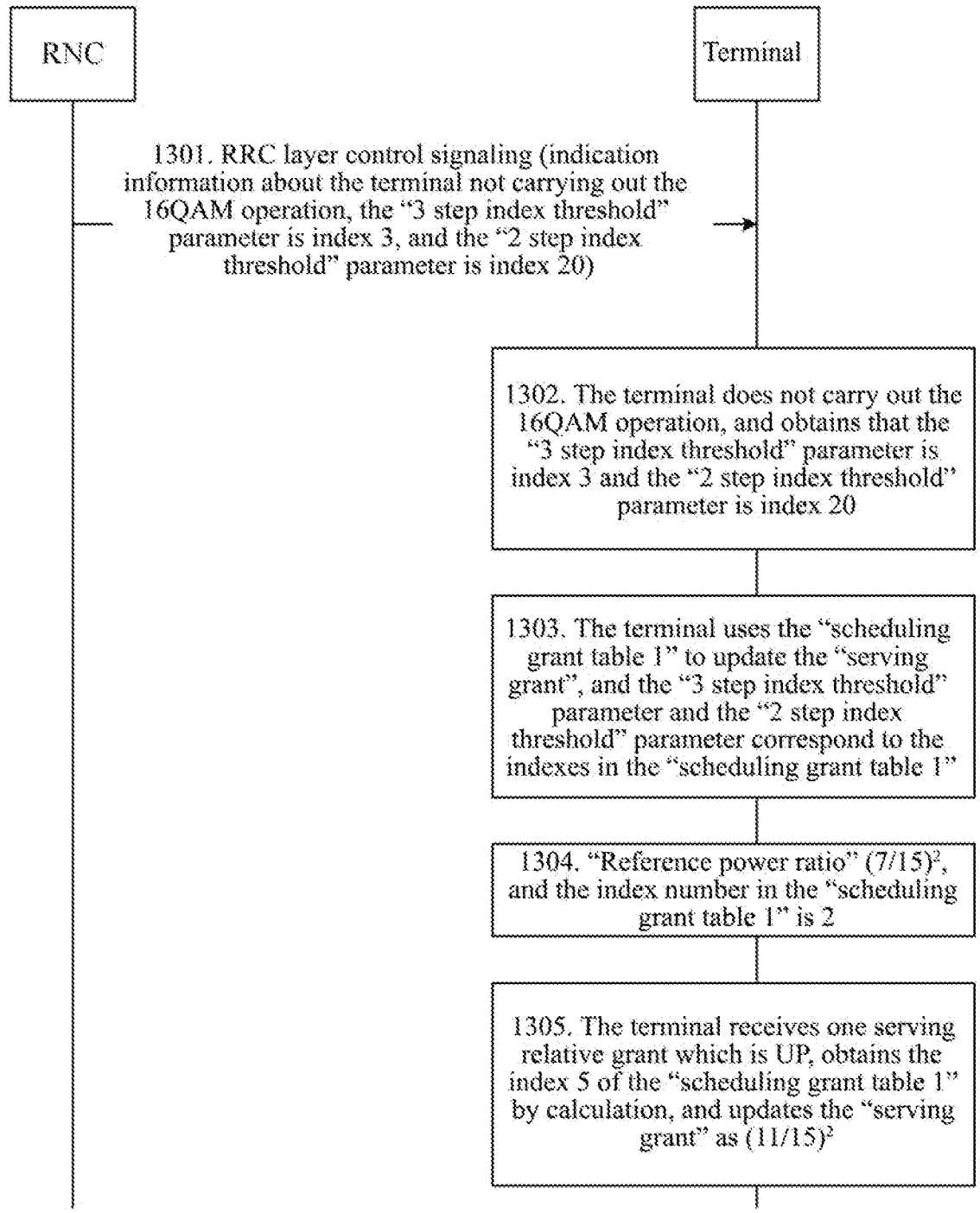
FIG. 13 is a flowchart of a grant processing method for a terminal in embodiment XIII of the present invention.

The embodiment XIII of the present invention is as shown in FIG. 13, and the particular processing flow is as follows:

in step 1301, the RNC sends a RRC layer control signaling to the terminal, and the signaling carries indication information about the terminal not carrying out the 16QAM operation, carries that the "3 step index threshold" parameter is index 3 and carries that the "2 step index threshold" parameter is index 20.

In step 1302, the terminal receives the signaling and analyzes it.

The signaling carries indication information about the terminal not carrying out the 16QAM operation, so the terminal does not carry out the 16QAM operation; and the terminal obtains the information that the "3 step index threshold" parameter is index 3 and the "2 step index threshold" parameter is index 20.

In the 1303, when the terminal does not carry out the 16QAM operation, the terminal uses the "absolute grant value mapping relationship table 1" to map the absolute grant and the terminal uses the "scheduling grant table 1" to update the "serving grant". The "3 step index threshold" parameter and the "2 step index threshold" parameter correspond to the indexes in the "scheduling grant table 1".

In step 1304, the "reference power ratio" is the E-DPDCH/DPCCH power ratio selected by E-TFC for which previous one transmission time interval with the same HARQ process as that of current data transmission is used, which is $(7/15)^2$. The terminal determines that the minimum power ratio greater than or equal to the "reference power ratio" $(7/15)^2$ in the "scheduling grant table 1" is $(7/15)^2$, determines that the index number of the minimum power ratio $(7/15)^2$ in the "scheduling grant table 1" is 2, and marks the index number as "scheduling grant (power ratio)".

In step 1305, the terminal receives one serving relative grant (cell dedicated channel state or cell forward access channel state after conflict resolution) which is "UP", and the terminal judges that the "scheduling grant (power ratio)" (the value thereof is index 2) is less than the "3 step index threshold" (the value thereof is index 3), so the terminal updates the "serving grant" as the scheduling grant in the "scheduling grant table 1" corresponding to the MIN ("scheduling grant (power ratio)"+3, 37) index. MIN ("scheduling grant (power ratio)"+3, 37)=MIN (2+3, 37)=MIN (5, 37)=5. The scheduling grant in the "scheduling grant table 1" corresponding to index 5 is $(11/15)^2$. The terminal updates the "serving grant" as $(11/15)^2$.

Figure 14:
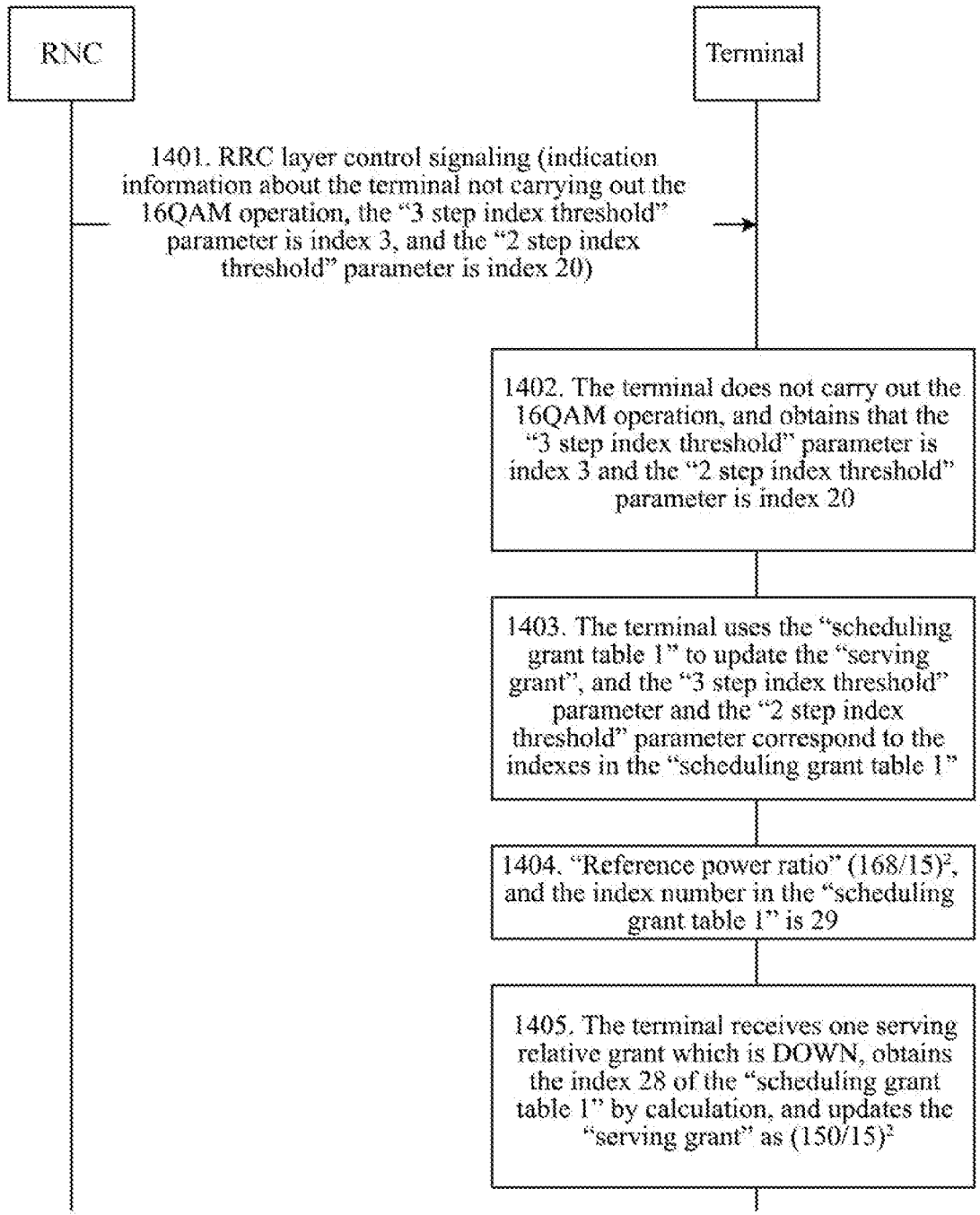
FIG. 14 is a flowchart of a grant processing method for a terminal in embodiment XIV of the present invention.

The embodiment XIV of the present invention is as shown in FIG. 14, and the particular processing flow is as follows:

in step 1401, the RNC sends a RRC layer control signaling to the terminal, and the signaling carries indication information about the terminal not carrying out the 16QAM operation, carries that the "3 step index threshold" parameter is index 3 and carries that the "2 step index threshold" parameter is index 20.

In step 1402, the terminal receives the signaling and analyzes it.

The signaling carries indication information about the terminal not carrying out the 16QAM operation, so the terminal does not carry out the 16QAM operation; and the terminal obtains the information that the "3 step index threshold" parameter is index 3 and the "2 step index threshold" parameter is index 20.

In the 1403, when the terminal does not carry out the 16QAM operation, the terminal uses the "absolute grant value mapping relationship table 1" to map the absolute grant and the terminal uses the "scheduling grant table 1" to update the "serving grant". The "3 step index threshold" parameter and the "2 step index threshold" parameter correspond to the indexes in the "scheduling grant table 1".

In step 1404, the "reference power ratio" is the E-DPDCH/DPCCH power ratio selected by E-TFC for which previous one transmission time interval with the same HARQ process as that of current data transmission is used, which is $(168/15)^2$. The terminal determines that the minimum power ratio greater than or equal to the "reference power ratio" $(168/15)^2$ in the "scheduling grant table 1" is $(168/15)^2$, determines that the index number of the minimum power ratio $(168/15)^2$ in the "scheduling grant table 1" is 29, and marks the index number as "scheduling grant (power ratio)".

In step 1405, the terminal receives one serving relative grant (cell dedicated channel state or cell forward access channel state after conflict resolution) which is "DOWN", and the terminal updates the "serving grant" as the scheduling grant in the "scheduling grant table 1 corresponding to the MAX ("scheduling grant (power ratio)"−1, 0)" index. MAX ("scheduling grant (power ratio)"−1, 0)=MAX (29−1, 0)=MAX (28, 0)=28. The scheduling grant in the "scheduling grant table 1" corresponding to index 28 is $(150/15)^2$. The terminal updates the "serving grant" as $(150/15)^2$.

Figure 15:
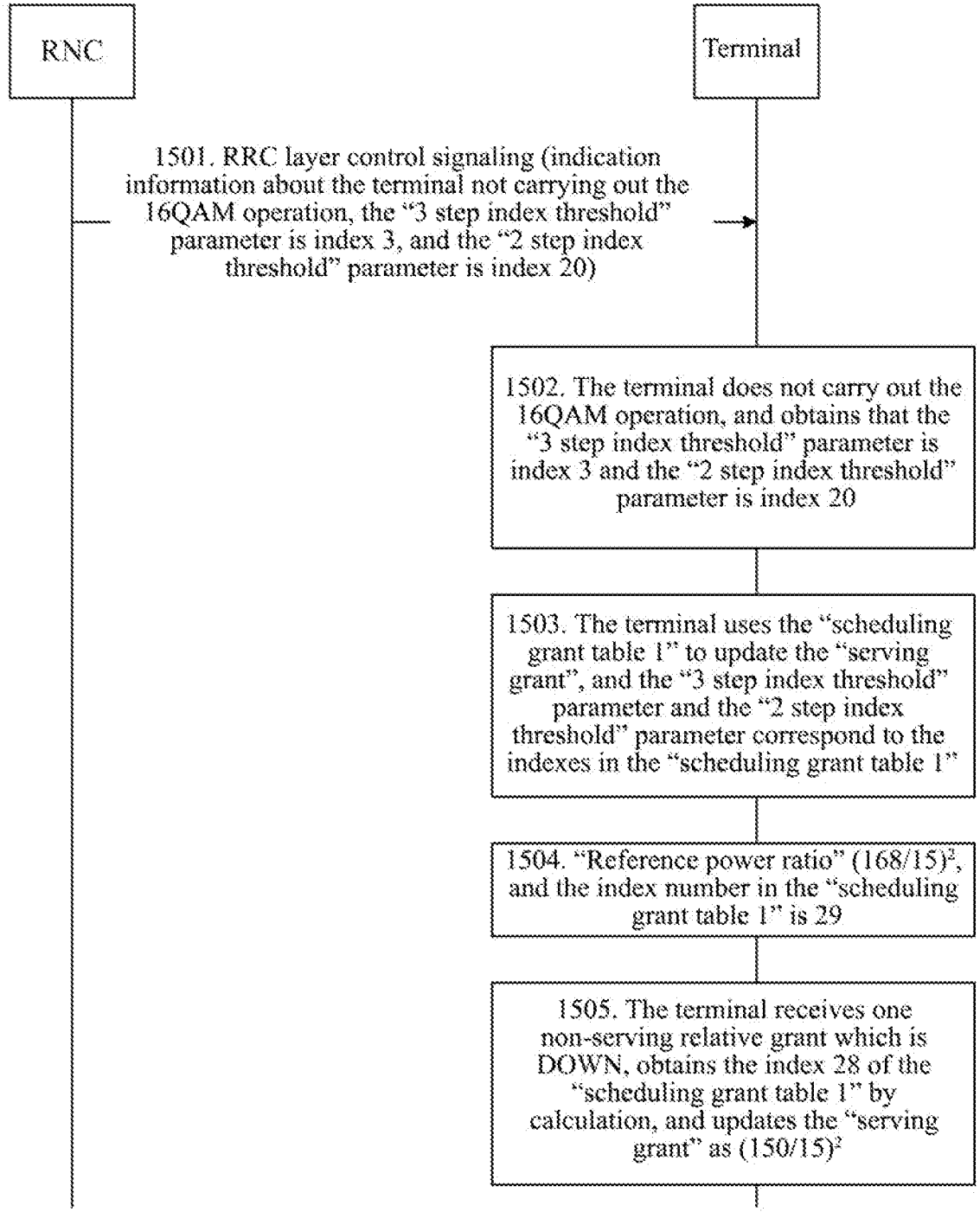
FIG. 15 is a flowchart of a grant processing method for a terminal in embodiment XV of the present invention.

The embodiment XV of the present invention is as shown in FIG. 15, and the particular processing flow is as follows:

in step 1501, the RNC sends a RRC layer control signaling to the terminal, and the signaling carries indication information about the terminal not carrying out the 16QAM operation, carries that the "3 step index threshold" parameter is index 3 and carries that the "2 step index threshold" parameter is index 20.

In step 1502, the terminal receives the signaling and analyzes it.

The signaling carries indication information about the terminal not carrying out the 16QAM operation, so the terminal does not carry out the 16QAM operation; and the terminal obtains the information that the "3 step index threshold" parameter is index 3 and the "2 step index threshold" parameter is index 20.

In the 1503, when the terminal does not carry out the 16QAM operation, the terminal uses the "absolute grant value mapping relationship table 1" to map the absolute grant and the terminal uses the "scheduling grant table 1" to update the "serving grant". The "3 step index threshold" parameter and the "2 step index threshold" parameter correspond to the indexes in the "scheduling grant table 1".

In step 1504, the "reference recorded and stored power ratio" is a recorded and stored new value when the E-DPDCH/DPCCH power ratio selected by the E-TFC, for which the previous one transmission time interval with the same HARQ process as that of the current data transmission is used, is updated to the new value, and the maximum "reference recorded and stored power ratio" is $(168/15)^2$. The terminal determines that the minimum power ratio greater than or equal to the maximum "reference recorded and stored power ratio" $(168/15)^2$ in the "scheduling grant table 1" is $(168/15)^2$, determines that the index number of the minimum power ratio $(168/15)^2$ in the "scheduling grant table 1" is 29, and marks the index number as "scheduling grant (recorded and stored power ratio)".

In step 1505, when the terminal receives one non-serving relative grant which is "DOWN", then the terminal updates the "serving grant" as the scheduling grant in the "scheduling grant table 1" corresponding to MAX ("scheduling grant (recorded and stored power ratio)"−1, 0) index. MAX ("scheduling grant (power ratio)"−1, 0)=MAX (29−1, 0)=MAX (28, 0)=28. The scheduling grant in the "scheduling grant table 1" corresponding to index 28 is $(150/15)^2$. The terminal updates the "serving grant" as $(150/15)^2$.

Corresponding to the above grant processing method for a terminal, the present invention also provides a terminal, including: a first processing module and a second processing module. In this case, the first processing module is for, when the terminal is carrying out the 16QAM operation, if an absolute grant is mapped by using "absolute grant value mapping relationship table 1," then using "scheduling grant table 1" to update "serving grant"; and if an absolute grant is mapped by using "absolute grant value mapping relationship table 2", then using "scheduling grant table 2" to update serving grant. The second processing module is for, when the terminal is not carrying out the 16QAM operation, using the "absolute grant value mapping relationship table 1" to map the absolute grant and using the "scheduling grant table 1" to update the serving grant.

In this case, whether the terminal carries out the 16QAM operation is indicated to the terminal by an RNC via an RRC layer signaling. Using the "absolute grant value mapping relationship table 1" to map the absolute grant or using the "absolute grant value mapping relationship table 2" to map the absolute grant is also indicated to the terminal by the RNC via the RRC layer signaling.

The first processing module is further used for referring to the "scheduling grant table 1" and updating the serving grant according to an algorithm of converting relative grant to serving grant, wherein two parameters involved in the algorithm, "3 step index threshold" and "2 step index threshold", are indicated to the terminal by the RNC via the RRC layer signaling and the "3 step index threshold" and "2 step index threshold" correspond to the indexes in the "scheduling grant table 1". The algorithm specifically includes:

when the terminal receives one serving relative grant (cell dedicated channel state or cell forward access channel state after conflict resolution), the terminal determines the minimum power ratio greater than or equal to the "reference power ratio" in the "scheduling grant table 1", determines the index number of the minimum power ratio in the "scheduling grant table 1", and marks the determined index number as "scheduling grant (power ratio)", wherein the "reference power ratio" is: the E-DPDCH/DPCCH power ratio selected by E-TFC for which previous one transmission time interval with the same HARQ process as that of current data transmission is used; and when terminal receives one non-serving relative grant, the terminal determines the minimum power ratio greater than or equal to the maximum "reference recorded and stored power ratio" in the "scheduling grant table 1", determines the index number of the minimum power ratio in the "scheduling grant table 1", and marks the index number as "scheduling grant (recorded and stored power ratio)", wherein the "reference recorded and stored power ratio" is: a recorded and stored new value when the E-DPDCH/DPCCH power ratio selected by the E-TFC, for which the previous one transmission time interval with the same HARQ process as that of the current data transmission is used, is updated to the new value.

The first processing module is further used for referring to the "scheduling grant table 2" and updating the serving grant according to an algorithm of converting relative grant to serving grant, wherein two parameters involved in the algorithm, "3 step index threshold" and "2 step index threshold", are indicated to the terminal by the RNC via the RRC layer signaling and the "3 step index threshold" and "2 step index threshold" correspond to the indexes in the "scheduling grant table 2". The algorithm specifically includes:

when the terminal receives one serving relative grant (cell dedicated channel state or cell forward access channel state after conflict resolution), the terminal determines the minimum power ratio greater than or equal to the "reference power ratio" in the "scheduling grant table 2", determines the index number of the minimum power ratio in the "scheduling grant table 2", and marks the index number as "scheduling grant (power ratio)", wherein the "reference power ratio" is: the E-DPDCH/DPCCH power ratio selected by E-TFC for which previous one transmission time interval with the same HARQ process as that of current data transmission is used; and when terminal receives one non-serving relative grant, the terminal determines the minimum power ratio greater than or equal to the maximum "reference recorded and stored power ratio" in the "scheduling grant table 2", determines the index number of the minimum power ratio in the "scheduling grant table 2", and marks the index number as "scheduling grant (recorded and stored power ratio)", wherein the "reference recorded and stored power ratio" is: a recorded and stored new value when the E-DPDCH/DPCCH power ratio selected by the E-TFC, for which the previous one transmission time interval with the same HARQ process as that of the current data transmission is used, is updated to the new value.

What is described above are merely preferred embodiments of the present invention, and not intended to limit the protection scope of the present invention.

INDUSTRIAL APPLICABILITY

A terminal and a grant processing method therefor is provided by the present invention, and when the terminal is carrying out the 16QAM operation and maps the absolute grant by using the "absolute grant value mapping relationship table 1", the terminal updates the "serving grant" by using the "scheduling grant table 1"; and in the situation where the absolute grant is mapped by using the "absolute grant value mapping relationship table 2", then the terminal updates the "serving grant" by using "scheduling grant table 2". As such, the "absolute grant value mapping relationship table 1" reflecting the absolute grant matches the "scheduling grant table 1" reflecting relative grant, and the "absolute grant value mapping relationship table 2" reflecting the absolute grant matches the "scheduling grant table 2" reflecting relative grant. The upper limits in these two groups of matching tables are completely consistent, and complete coverage of absolute grant and relative grant can be achieved. The lower limits of these two groups of matching tables are spaced with 2 values, and after the absolute grant, finer regulation can be achieved by using a relative grant command once. By way of the present invention, the boundaries of various tables match each other as far as possible, thereby the performance problem appearing during the engineering application can be solved, improving the performance of HSUPA technology during engineering application.

What is claimed is:

1. A grant processing method for terminal, comprising:
when a terminal carries out 16 quadrature amplitude modulation (16QAM) operation, if an absolute grant is mapped by using absolute grant value mapping relationship table 1, then using scheduling grant table 1 to update a serving grant; and if the absolute grant is mapped by using absolute grant value mapping relationship table 2, then using scheduling grant table 2 to update the serving grant;
further comprising:
when using the scheduling grant table 1 to update the serving grant, the terminal referring to the scheduling grant table 1 and updating the serving grant according to an algorithm of converting relative grant to serving grant; two parameters involved in the algorithm, 3 step index threshold and 2 step index threshold, being indicated to the terminal by RNC via a RRC layer signaling and the 3 step index threshold and the 2 step index threshold corresponding to indexes in the scheduling grant table 1;
when using the scheduling grant table 2 to update the serving grant, the terminal referring to the scheduling grant table 2 and updating the serving grant according to an algorithm of converting relative grant to serving grant; two parameters involved in the algorithm, 3 step index threshold and 2 step index threshold, being indicated to the terminal by RNC via a RRC layer signaling and the 3 step index threshold and the 2 step index threshold corresponding to indexes in the scheduling grant table 2.

2. The grant processing method for terminal according to claim 1, further comprising: when the terminal does not carry out the 16QAM operation, using the absolute grant value mapping relationship table 1 to map the absolute grant and the terminal using the scheduling grant table 1 to update the serving grant.

3. The grant processing method for terminal according to claim 1, further comprising: whether the terminal carries out the 16QAM operation being indicated to the terminal by a radio network controller (RNC) via a radio resource control (RRC) layer signaling.

4. The grant processing method for terminal according to claim 1, further comprising: the terminal using the absolute grant value mapping relationship table 1 to map the absolute grant or using the absolute grant value mapping relationship table 2 to map the absolute grant being indicated to the terminal by RNC via a RRC layer signaling.

5. The grant processing method for terminal according to claim 1, wherein, when using the scheduling grant table 1 to update the serving grant, the algorithm comprises:
when the terminal receives one serving relative grant, the terminal determining a minimum power ratio greater than or equal to a reference power ratio in the scheduling grant table 1, determining an index number of the minimum power ratio in the scheduling grant table 1, and marking the determined index number as scheduling grant, wherein the reference power ratio is: enhanced dedicated channel dedicated physical data channel (E-DPDCH)/dedicated physical control channel (DPCCH) power ratio selected by enhanced dedicated channel transport format combination (E-TFC) for which previous one transmission time interval with the same hybrid automatic repeat request (HARQ) process as that of current data transmission is used;
when the terminal receives one non-serving relative grant, the terminal determining a minimum power ratio greater than or equal to a maximum reference recorded and stored power ratio in the scheduling grant table 1, determining an index number of the minimum power ratio in the scheduling grant table 1, and marking the index number as scheduling grant, wherein the reference recorded and stored power ratio is: a recorded and stored new value when the E-DPDCH/DPCCH power ratio selected by the E-TFC, for which the previous one transmission time interval with the same HARQ process as that of the current data transmission is used, is updated to the new value.

6. The grant processing method for terminal according to claim 1, wherein, when using the scheduling grant table 2 to update the serving grant, the algorithm comprises:
when the terminal receives one serving relative grant, the terminal determining a minimum power ratio greater than or equal to a reference power ratio in the scheduling grant table 2, determining an index number of the minimum power ratio in the scheduling grant table 2, and marking the index number as scheduling grant, wherein the reference power ratio is: E-DPDCH/DPCCH power ratio selected by E-TFC for which previous one transmission time interval with the same HARQ process as that of current data transmission is used;
when terminal receives one non-serving relative grant, the terminal determining a minimum power ratio greater than or equal to a maximum reference recorded and stored power ratio in the scheduling grant table 2, determining an index number of the minimum power ratio in the scheduling grant table 2, and marking the index number as scheduling grant, wherein the reference recorded and stored power ratio is: a recorded and stored new value when the E-DPDCH/DPCCH power ratio selected by the E-TFC, for which the previous one transmission time interval with the same HARQ process as that of the current data transmission is used, is updated to the new value.

7. A terminal, comprising:
a first processing module configured to, when the terminal carries out 16QAM operation, if an absolute grant is mapped by using absolute grant value mapping relationship table 1, use scheduling grant table 1 to update serving grant; and if the absolute grant is mapped by using absolute grant value mapping relationship table 2, use scheduling grant table 2 to update the serving grant;

a second processing module configured to, when the terminal does not carry out the 16QAM operation, use the absolute grant value mapping relationship table 1 to map the absolute grant and use the scheduling grant table 1 to update the serving grant;

wherein whether the terminal is to carry out the 16QAM operation is indicated to the terminal by RNC via a RRC layer signaling;

the first processing module is further configured to, when using the scheduling grant table 1 to update the serving grant, refer to the scheduling grant table 1 and update the serving grant according to an algorithm of converting relative grant to serving grant, wherein two parameters involved in the algorithm, 3 step index threshold and 2 step index threshold, are indicated to the terminal by RNC via a RRC layer signaling and the 3 step index threshold and the 2 step index threshold correspond to indexes in the scheduling grant table 1;

the first processing module is further configured to, when using the scheduling grant table 2 to update the serving grant, refer to the scheduling grant table 2 and updating the serving grant according to an algorithm of converting relative grant to serving grant, wherein two parameters involved in the algorithm, 3 step index threshold and 2 step index threshold, are indicated to the terminal by RNC via a RRC layer signaling and the 3 step index threshold and the 2 step index threshold correspond to indexes in the scheduling grant table 2.

8. The terminal according to claim 7, wherein using the absolute grant value mapping relationship table 1 to map the absolute grant or using the absolute grant value mapping relationship table 2 to map the absolute grant is indicated to the terminal by RNC via a RRC layer signaling.

9. The terminal according to claim 7, wherein, when using the scheduling grant table 1 to update the serving grant, the algorithm comprises:

when the terminal receives one serving relative grant, determining a minimum power ratio greater than or equal to a reference power ratio in the scheduling grant table 1, determining an index number of the minimum power ratio in the scheduling grant table 1, and marking the determined index number as scheduling grant, wherein the reference power ratio is: E-DPDCH/DPCCH power ratio selected by E-TFC for which previous one transmission time interval with the same HARQ process as that of current data transmission is used;

when terminal receives one non-serving relative grant, determining a minimum power ratio of the greater than or equal to a maximum reference recorded and stored power ratio in the scheduling grant table 1, determining an index number of the minimum power ratio in the scheduling grant table 1, and marking the index number as scheduling grant, wherein the reference recorded and stored power ratio is: a recorded and stored new value when the E-DPDCH/DPCCH power ratio selected by the E-TFC, for which the previous one transmission time interval with the same HARQ process as that of the current data transmission is used, is updated to the new value.

10. The terminal according to claim 7, wherein, when using the scheduling grant table 2 to update the serving grant, the algorithm comprises:

when the terminal receives one serving relative grant, determining a minimum power ratio greater than or equal to a reference power ratio in the scheduling grant table 2, determining an index number of the minimum power ratio in the scheduling grant table 2, and marking the index number as scheduling grant, wherein the reference power ratio is: E-DPDCH/DPCCH power ratio selected by E-TFC for which previous one transmission time interval with the same HARQ process as that of current data transmission is used;

when terminal receives one non-serving relative grant, determining a minimum power ratio greater than or equal to a maximum reference recorded and stored power ratio in the scheduling grant table 2, determining an index number of the minimum power ratio in the scheduling grant table 2, and marking the index number as scheduling grant, wherein the reference recorded and stored power ratio is: a recorded and stored new value when the E-DPDCH/DPCCH power ratio selected by the E-TFC, for which the previous one transmission time interval with the same HARQ process as that of the current data transmission is used, is updated to the new value.

* * * * *